(12) United States Patent
Abercrombie et al.

(10) Patent No.: US 10,475,251 B2
(45) Date of Patent: *Nov. 12, 2019

(54) METHOD AND APPARATUS FOR MULTIPLE MODE INTERFACE

(71) Applicant: Atheer, Inc., Mountain View, CA (US)

(72) Inventors: Nathan Abercrombie, Mountain View, CA (US); Iryna Issayeva, Foster City, CA (US); Greg James, Redwood City, CA (US); Sleiman Itani, East Palo Alto, CA (US)

(73) Assignee: Atheer, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,916

(22) Filed: Oct. 24, 2018

(65) Prior Publication Data

US 2019/0066386 A1 Feb. 28, 2019

Related U.S. Application Data

(63) Continuation of application No. 14/505,295, filed on Oct. 2, 2014, now Pat. No. 10,163,264.

(60) Provisional application No. 61/885,896, filed on Oct. 2, 2013.

(51) Int. Cl.
    *G06F 3/01*      (2006.01)
    *G06T 19/00*     (2011.01)
    *G06F 3/0481*    (2013.01)

(52) U.S. Cl.
    CPC ............ *G06T 19/006* (2013.01); *G06F 3/011* (2013.01); *G06F 3/013* (2013.01); *G06F 3/017* (2013.01); *G06F 3/04815* (2013.01)

(58) Field of Classification Search
    None
    See application file for complete search history.

(56) References Cited

U.S. PATENT DOCUMENTS

| 7,148,892 B2 | 12/2006 | Robertson et al. | |
| 2003/0011619 A1* | 1/2003 | Jacobs | G06T 15/80 345/619 |
| 2010/0238137 A1* | 9/2010 | Han | G06F 3/017 345/175 |

(Continued)

*Primary Examiner* — Frank S Chen
(74) *Attorney, Agent, or Firm* — Mohr Intellectual Property Law Solutions, PC

(57) ABSTRACT

A method, system, apparatus, and/or device for executing a translation instruction for a constructive movement. The method, system, apparatus, and/or device may include an input device configured to sense a first constructive movement input representative of a non-translational movement of a body of a user that does not move from a first point to a second point in the physical world environment. The method, system, apparatus, and/or device may include a processing device coupled to the input device, where the processing device is configured to execute a translational instruction associated with the first constructive movement input, execute a first resizing instruction to reduce a size of a portion of the physical world environment as displayed by a head-mounted display by an amount indicated by the first resizing stimulus, receive a second constructive movement input, and execute a second translational instruction associated with the second constructive translational movement input.

19 Claims, 20 Drawing Sheets

(56) References Cited

U.S. PATENT DOCUMENTS

| | | | |
|---|---|---|---|
| 2012/0079046 A1* | 3/2012 | Murphy | G06N 3/006 709/206 |
| 2013/0237378 A1* | 9/2013 | Carrell | A63C 17/061 482/51 |
| 2014/0132629 A1 | 5/2014 | Pandey et al. | |
| 2014/0152558 A1 | 6/2014 | Salter et al. | |
| 2014/0210702 A1 | 7/2014 | Peterson et al. | |
| 2014/0282144 A1 | 9/2014 | Maciocci | |
| 2014/0306891 A1 | 10/2014 | Latta et al. | |
| 2014/0347390 A1 | 11/2014 | Poulos et al. | |
| 2014/0368537 A1* | 12/2014 | Salter | G06T 19/006 345/633 |

* cited by examiner

METHOD AND APPARATUS FOR MULTIPLE MODE INTERFACE

CROSS-REFERENCE TO RELATED APPLICATION

This application is a continuation of U.S. patent application Ser. No. 14/505,295, filed Oct. 2, 2014, which claims the benefit of U.S. provisional patent application No. 61/885,896 filed on Oct. 2, 2013, the contents of which are incorporated by reference for all intents and purposes.

BACKGROUND

A user interface may serve as a space or environment wherein a user interacts with some system, for example receiving data from that system and/or sending instructions to the system. The term is frequently applied to the use of computers and other information systems.

To date many user interfaces, including but not limited to graphical interfaces, have been designed to support a single mode of interaction. For certain environments, such an arrangement may be suitable. However, as environments become increasingly rich in terms of the amount and complexity of content therein, the number and sophistication of available system functions, the environment dimensionality (for example 2D or 3D), etc., single-mode interfaces may prove insufficiently flexible to support a desired level of user interaction.

There is a need for a simple, efficient method and apparatus for interfacing between a user and a system, potentially supporting multiple modes of interaction.

SUMMARY

The present embodiment contemplates a variety of systems, apparatus, methods, and paradigms for interacting with the system using multiple modes.

In one embodiment of the present embodiment, a machine-implemented method is provided that includes establishing a world space, the world space being adapted to accept at least one entity therein, the world entity comprising at least one of a group consisting of a virtual reality entity and an augmented reality entity, wherein translation by a viewer substantially corresponds with translation with respect to the world space, and wherein rotation by the viewer substantially corresponds with rotation with respect to the world space. The method also includes establishing a sphere space, the sphere space being adapted to accept at least one entity therein, wherein translation by the viewer corresponds with substantially zero translation with respect to the sphere space, and wherein rotation by the viewer substantially corresponds with rotation with respect to the sphere space. The method further includes establishing a display space, the display space being adapted to accept at least one entity therein, wherein translation by the viewer corresponds with substantially zero translation with respect to the display space, and wherein rotation by the viewer corresponds with substantially zero rotation with respect to the display space.

The method may include establishing a world space rotation stimulus, and establishing a world space rotation response with the world space rotation response including a rotation of the world space relative to the viewer not corresponding with the rotation by the viewer, sensing the presence of the world space rotation stimulus, and executing the world space rotation response if the world space rotation stimulus is present. The world space rotation stimulus may include a user input. The world space rotation stimulus may include a hand posture, a hand gesture, a stylus posture, a stylus gesture, an eye gesture, and/or a brainwave modulation.

The method may include establishing a world space translation stimulus, and establishing a world space translation response with the world space translation response including a translation of the world space relative to the viewer not corresponding with the translation by the viewer, sensing the presence of the world space translation stimulus, and executing the world space translation response if the world space translation stimulus is present. The world space translation stimulus may include a user input. The world space translation stimulus may include a hand posture, a hand gesture, a stylus posture, a stylus gesture, an eye gesture, and/or a brainwave modulation.

The method may include establishing a world space resizing stimulus, and establishing a world space resizing response with the world space resizing response including a change in size of the world space relative to the viewer, sensing a presence of the world space resizing stimulus, and executing the world space resizing response if the world space resizing stimulus is present. The world space resizing stimulus may include a user input. The world space resizing stimulus may include a hand posture, a hand gesture, a stylus posture, a stylus gesture, an eye gesture, and/or a brainwave modulation.

The method may include establishing a sphere space rotation stimulus, and establishing a sphere space rotation response, the sphere space rotation response including a rotation of the sphere space relative to the viewer not corresponding with the rotation by the viewer, sensing a presence of the sphere stimulus, and executing the sphere response if the sphere stimulus is present. The sphere space rotation stimulus may include a user input. The sphere space rotation stimulus may include a hand posture, a hand gesture, a stylus posture, a stylus gesture, an eye gesture, and/or a brainwave modulation.

The method may include establishing a sphere space translation stimulus, and establishing a sphere space translation response with the sphere space rotation response comprising a translation of the sphere space relative to the viewer not corresponding with the translation by the viewer, sensing a presence of the sphere space translation stimulus, and executing the sphere space translation response if the sphere space translation stimulus is present. The sphere space translation stimulus may include a user input. The sphere space translation stimulus may include a hand posture, a hand gesture, a stylus posture, a stylus gesture, an eye gesture, and/or a brainwave modulation.

The method may include establishing a sphere space resizing stimulus, and establishing a sphere space resizing response with the sphere space resizing response including a change in size of the sphere space relative to the viewer, sensing a presence of the sphere space resizing stimulus, and executing the sphere space resizing response if the sphere space resizing stimulus is present. The sphere space resizing stimulus may include a user input. The sphere space resizing stimulus may include a hand posture, a hand gesture, a stylus posture, a stylus gesture, an eye gesture, and/or a brainwave modulation.

The method may include establishing a display space rotation stimulus, and establishing a display space rotation response with the display space rotation response including a rotation of the display space relative to the viewer not corresponding with the rotation by the viewer, sensing a presence of the display space rotation stimulus, and executing the display space rotation response if the display space rotation stimulus is present. The display space rotation stimulus may include a user input. The display space rotation stimulus may include a hand posture, a hand gesture, a stylus posture, a stylus gesture, an eye gesture, and/or a brainwave modulation.

The method may include establishing a display space translation stimulus, and establishing a display space translation response with the display space translation response including a translation of the display space relative to the viewer not corresponding with the translation by the viewer, sensing a presence of the display space translation stimulus, and executing the display space translation response if the display space translation stimulus is present. The display space translation stimulus may include a user input. The display space translation stimulus may include a hand posture, a hand gesture, a stylus posture, a stylus gesture, an eye gesture, and/or a brainwave modulation.

The method may include establishing a display space resizing stimulus, and establishing a display space resizing response with the display space resizing response including a change in size of the display space relative to the viewer, sensing a presence of the display space resizing stimulus, and executing the display space resizing response if the display space resizing stimulus is present. The display space resizing stimulus may include a user input. The display space resizing stimulus may include a hand posture, a hand gesture, a stylus posture, a stylus gesture, an eye gesture, and/or a brainwave modulation.

The translation by the user may include constructive translation. The rotation by the user may include constructive rotation.

The method may include establishing an entity resizing stimulus and establishing an entity resizing response with the entity resizing response including a change of size of at least one of the at least one entities, sensing a presence of the entity resizing stimulus, and executing the entity resizing response if the entity resizing stimulus is present. The entity resizing stimulus may include a user input. The entity resizing stimulus may include a voice command, a hand posture, a hand gesture, a stylus posture, a stylus gesture, an eye gesture, and/or a brainwave modulation.

In another embodiment of the present embodiment, an apparatus is provided that includes a processor, at least one sensor in communication with the processor, the sensor being adapted to sense a translation of a viewer and a rotation of the viewer, and an outputter in communication with the processor. The processor is adapted to establish a world space, the world space being adapted to at least one virtual reality entity or augmented reality entity therein. The processor is adapted to establish a sphere space, the sphere space being adapted to accept at least one virtual reality entity or augmented reality entity therein. The processor is adapted to establish a display space, the display space being adapted to accept at least one virtual reality entity or augmented reality entity therein.

For the translation of the viewer as sensed by the sensor, the processor is adapted to determine a substantially corresponding translation of the viewer with respect to the world space. For the rotation of the viewer as sensed by the sensor, the processor is adapted to determine a substantially corresponding rotation of the viewer with respect to the world space. For the translation of the viewer as sensed by the sensor, the processor is adapted to determine a substantially corresponding translation of the viewer with respect to the sphere space. For the rotation of the viewer as sensed by the sensor, the processor is adapted to determine a substantially zero rotation of the viewer with respect to the sphere space. For the translation of the viewer as sensed by the sensor, the processor is adapted to determine a substantially zero translation of the viewer with respect to the display space. For the rotation of the viewer as sensed by the sensor, the processor is adapted to determine a substantially zero rotation of the viewer with respect to the display space.

The outputter is adapted to output the substantially corresponding translation of the viewer with respect to the world space. The outputter is adapted to output the substantially corresponding rotation of the viewer with respect to the world space. The outputter is adapted to output the substantially corresponding translation of the viewer with respect to the sphere space. The outputter is adapted to output the substantially zero rotation of the viewer with respect to the sphere space. The outputter is adapted to output the substantially zero translation of the viewer with respect to the display space. The outputter is adapted to output the substantially zero rotation of the viewer with respect to the display space.

The sensor may include an imager. The sensor may include a stereo pair of imagers. The sensor may be an accelerometer, a gyroscope, a GPS sensor, a magnetometer, a structured light sensor, a time-of-flight sensor, an ultrasonic sensor, and/or a wireless signal triangulation sensor.

The outputter may include a visual display. The outputter may include a stereo visual display.

At least a portion of the apparatus may be disposed on a head-mounted display.

In another embodiment of the present embodiment, an apparatus is provided that includes means for establishing a world space, the world space being adapted to accept virtual reality entities and/or augmented reality entities therein, wherein translation by a viewer substantially corresponds with translation with respect to the world space, and wherein rotation by the viewer substantially corresponds with rotation with respect to the world space. The apparatus also includes means for establishing a sphere space, the sphere space being adapted to accept virtual reality entities and/or augmented reality entities therein, wherein translation by the viewer corresponds with substantially zero translation with respect to the sphere space, and wherein rotation by the viewer substantially corresponds with rotation with respect to the sphere space. The apparatus further includes means for establishing a display space, the display space being adapted to accept virtual reality entities and/or augmented reality entities therein, wherein translation by the viewer corresponds with substantially zero translation with respect to the display space, and wherein rotation by the viewer corresponds with substantially zero rotation with respect to the display space.

In another embodiment of the present embodiment, a machine-implemented method is provided that includes determining a translation of a viewer and determining a rotation of the viewer. For a world space adapted to accept at least one entity therein, the entity including at least one of a group consisting of a virtual reality entity and an augmented reality entity, if the translation of the viewer is determined to be present, in response thereto a world space translation change is applied to the world space substantially corresponding with the translation of the viewer. For a sphere space adapted to accept at least one entity therein, if the translation of the viewer is determined to be present, in response thereto substantially zero translation change is applied to the sphere space. For a display space adapted to accept at least one the entity therein, if the translation of the viewer is determined to be present, in response thereto substantially zero translation change is applied to the display space. Again for the world space, if the rotation of the viewer is determined to be present, in response thereto a world space rotation change is applied to the world space substantially corresponding with the rotation of the viewer. Again for the sphere space, if the rotation of the viewer is determined to be present, in response thereto a sphere space rotation change is applied to the sphere space substantially corresponding with the rotation of the viewer. Again for the display space, if the rotation of the viewer is determined to be present, in response thereto substantially zero rotation change is applied to the display space.

The method may include determining a presence of a world space rotation stimulus, and if the world space rotation stimulus is presently executing a world space rotation response, the world space rotation response including a rotation of the world space relative to the viewer not corresponding with the rotation by the viewer. The world space rotation stimulus may include a user input. The world space rotation stimulus may include a voice command, a hand posture, a hand gesture, a stylus posture, a stylus gesture, an eye gesture, and/or a brainwave modulation.

The method may include determining a presence of a world space translation stimulus, and if the world space translation stimulus is presently executing a world space translation response, the world space translation response including a translation of the world space relative to the viewer not corresponding with the translation by the viewer. The world space translation stimulus includes a user input. The world space translation stimulus may include a voice command, a hand posture, a hand gesture, a stylus posture, a stylus gesture, an eye gesture, and/or a brainwave modulation.

The method may include determining a presence of a world space resizing stimulus, and if the world space resizing stimulus is present executing a world space resizing response, the world space resizing response including a change in the size of the world space relative to the viewer. The world space resizing stimulus may include a user input. The world space resizing stimulus may include a voice command, a hand posture, a hand gesture, a stylus posture, a stylus gesture, an eye gesture, and/or a brainwave modulation.

The method may include determining a presence of a sphere space rotation stimulus, and if the sphere space rotation stimulus is presently executing a sphere space rotation response, the sphere space rotation response including a rotation of the sphere space relative to the viewer not corresponding with the rotation by the viewer. The sphere space rotation stimulus may include a user input. The sphere space rotation stimulus may include a voice command, a hand posture, a hand gesture, a stylus posture, a stylus gesture, an eye gesture, and/or a brainwave modulation.

The method may include determining a presence of a sphere space translation stimulus, and if the sphere space translation stimulus is presently executing a sphere space translation response, the sphere space translation response including a translation of the sphere space relative to the viewer not corresponding with the translation by the viewer. The sphere space translation stimulus may include a user input. The sphere space translation stimulus may include a voice command, a hand posture, a hand gesture, a stylus posture, a stylus gesture, an eye gesture, and/or a brainwave modulation.

The method may include determining a presence of a sphere space resizing stimulus, and if the sphere space resizing stimulus is present executing a sphere space resizing response, the sphere space resizing response including a change in the size of the sphere space relative to the viewer. The sphere space resizing stimulus may include a user input. The sphere space resizing stimulus may include a voice command, a hand posture, a hand gesture, a stylus posture, a stylus gesture, an eye gesture, and/or a brainwave modulation.

The method may include determining a display space rotation stimulus, and if the display space rotation stimulus is presently executing a display space rotation response, the display space rotation response including a rotation of the display space relative to the viewer not corresponding with the rotation by the viewer. The display space rotation stimulus may include a user input. The display space rotation stimulus may include a voice command, a hand posture, a hand gesture, a stylus posture, a stylus gesture, an eye gesture, and/or a brainwave modulation.

The method may include determining a presence of a display space translation stimulus, and if the display space translation stimulus is presently executing a display space translation response, the display space translation response including a translation of the display space relative to the viewer not corresponding with the translation by the viewer. The display space translation stimulus may include a user input. The display space translation stimulus may include a voice command, a hand posture, a hand gesture, a stylus posture, a stylus gesture, an eye gesture, and/or a brainwave modulation.

The method may include determining a presence of a display space resizing stimulus, and if the display space resizing stimulus is present executing a display space resizing response, the display space resizing response including a change in the size of the display space relative to the viewer. The display space resizing stimulus may include a user input. The display space resizing stimulus may include a voice command, a hand posture, a hand gesture, a stylus posture, a stylus gesture, an eye gesture, and/or a brainwave modulation.

The translation by the user may include constructive translation. The rotation by the user may include constructive rotation. The method may include determining a presence of an entity resizing stimulus, and if the entity resizing stimulus is presently executing an entity resizing response, the entity resizing response including a change of size of at least one of the at least one entities. The entity resizing stimulus may include a user input. The entity resizing stimulus may include a voice command, a hand posture, a hand gesture, a stylus posture, a stylus gesture, an eye gesture, and/or a brainwave modulation.

In another embodiment of the present embodiment, a processing interface is provided that includes a world space, the world space being adapted to accept at least one entity therein, the entity being virtual reality entity and/or an augmented reality entity, the world space being adapted to exhibit a world space translation change in response to a translation by a viewer, the world space translation change substantially corresponding with translation with respect to the world space. The world space is also adapted to exhibit a world space rotation change in response to a rotation by a viewer, the world space rotation change substantially corresponding with rotation with respect to the world space. The interface includes a sphere space, the sphere space being adapted to accept at least one entity therein, the sphere space being adapted to exhibit substantially zero change in response to the translation by the viewer. The sphere space is also adapted to exhibit a sphere space rotation change in response to the rotation by the viewer, the sphere space rotation change substantially corresponding with rotation with respect to the sphere space. The interface also includes a display space, the display space being adapted to accept at least one entity therein, the display space being adapted to exhibit substantially zero change in response to the translation by the viewer. The display space is also adapted to exhibit substantially zero change in response to the rotation by the viewer.

The world space may be adapted to exhibit a world space rotation response in response to a world space rotation stimulus, with the world space rotation response including a rotation of the world space relative to the viewer not corresponding with the rotation by the viewer. The world space rotation stimulus may include a user input. The world space rotation stimulus may include a voice command, a hand posture, a hand gesture, a stylus posture, a stylus gesture, an eye gesture, and/or a brainwave modulation.

The world space interface may be adapted to exhibit a world space translation response in response to a world space translation stimulus, with the world space translation response including a translation of the world space relative to the viewer not corresponding with the translation by the viewer. The world space translation stimulus may include a user input. The world space translation stimulus may include a voice command, a hand posture, a hand gesture, a stylus posture, a stylus gesture, an eye gesture, and/or a brainwave modulation.

The world space interface may be adapted to exhibit a world space resizing response in response to a world space resizing stimulus, with the world space resizing response including a change in the size of the world space relative to the viewer. The world space resizing stimulus may include a user input. The world space resizing stimulus may include a voice command, a hand posture, a hand gesture, a stylus posture, a stylus gesture, an eye gesture, and/or a brainwave modulation.

The sphere space interface may be adapted to exhibit a sphere space rotation response in response to a sphere space rotation stimulus, with the sphere space rotation response including a rotation of the sphere space relative to the viewer not corresponding with the rotation by the viewer. The sphere space rotation stimulus may include a user input. The sphere space rotation stimulus may include a voice command, a hand posture, a hand gesture, a stylus posture, a stylus gesture, an eye gesture, and/or a brainwave modulation.

The sphere space interface may be adapted to exhibit a sphere space translation response in response to a sphere space translation stimulus, with the sphere space translation response including a translation of the sphere space relative to the viewer not corresponding with the translation by the viewer. The sphere space translation stimulus may include a user input. The sphere space translation stimulus may include a voice command, a hand posture, a hand gesture, a stylus posture, a stylus gesture, an eye gesture, and/or a brainwave modulation.

The sphere space may be adapted to exhibit a sphere space resizing response in response to a sphere space resizing stimulus, with the sphere space resizing response including a change in the size of the sphere space relative to the viewer. The sphere space resizing stimulus may include a user input. The sphere space resizing stimulus may include a voice command, a hand posture, a hand gesture, a stylus posture, a stylus gesture, an eye gesture, and/or a brainwave modulation.

The display space may be adapted to exhibit a display space rotation response in response to a display space rotation stimulus, with the display space rotation response including a rotation of the display space relative to the viewer not corresponding with the rotation by the viewer. The display space rotation stimulus may include a user input. The display space rotation stimulus may include a voice command, a hand posture, a hand gesture, a stylus posture, a stylus gesture, an eye gesture, and/or a brainwave modulation.

The display space may be adapted to exhibit a display space translation response in response to a display space translation stimulus, with the display space translation response including a translation of the display space relative to the viewer not corresponding with the translation by the viewer. The display space translation stimulus may include a user input. The display space translation stimulus may include a voice command, a hand posture, a hand gesture, a stylus posture, a stylus gesture, an eye gesture, and/or a brainwave modulation.

The display space may be adapted to exhibit a display space resizing response in response to a display space resizing stimulus, with the display space resizing response including a change in the size of the display space relative to the viewer. The display space resizing stimulus may include a user input. The display space resizing stimulus may include a voice command, a hand posture, a hand gesture, a stylus posture, a stylus gesture, an eye gesture, and/or a brainwave modulation.

The translation by the user may include constructive translation. The rotation by the user may include constructive rotation.

At least one of the world space, the sphere space, and the display space may be adapted to exhibit an entity resizing response in response to an entity resizing stimulus, the entity resizing stimulus including a change in the size of at least one of the at least one entities. The entity resizing stimulus may include a user input. The entity resizing stimulus may include a voice command, a hand posture, a hand gesture, a stylus posture, a stylus gesture, an eye gesture, and/or a brainwave modulation.

At least one of the at least one entities may be adapted to exhibit an entity resizing response in response to an entity resizing stimulus, the entity resizing stimulus including a change in the size of at least one of the at least one entities. The entity resizing stimulus may include a user input. The entity resizing stimulus may include a voice command, a hand posture, a hand gesture, a stylus posture, a stylus gesture, an eye gesture, and/or a brainwave modulation.

In another embodiment of the present embodiment, a method is provided that includes instantiating on a processor a translation determiner, the translation determiner including executable instructions adapted for determining a translation of a viewer, and instantiating on the processor a rotation determiner, the rotation determiner including executable instructions adapted for determining a rotation of a viewer. The method includes instantiating on the processor a world space, the world space including executable instructions adapted to accept at least one entity disposed therein, the entity including a virtual reality entity and/or an augmented reality entity. The world space includes executable instructions adapted to manifest a world space translation change in response to a translation by a viewer, the world space translation change substantially corresponding with translation with respect to the world space. The world space includes executable instructions adapted to manifest a world space rotation change in response to a rotation by a viewer, the world space rotation change substantially corresponding with rotation with respect to the world space. The method includes instantiating on the processor a sphere space, the sphere space including executable instructions adapted to accept at least one entity disposed therein. The sphere space includes executable instructions adapted to manifest substantially zero change in response to the translation by the viewer. The sphere space includes executable instructions adapted to manifest a sphere space rotation change in response to the rotation by the viewer, the sphere space rotation change substantially corresponding with rotation with respect to the sphere space. The method includes instantiating on the processor a display space, the display space including executable instructions adapted to accept at least one entity disposed therein. The display space includes executable instructions adapted to manifest substantially zero change in response to the translation by the viewer. The display space includes executable instructions adapted to manifest substantially zero change in response to the rotation by the viewer.

The method may include instantiating on the processor an exception determiner, the exception determiner including executable instructions adapted to determine a presence of a world space rotation stimulus, world space translation stimulus, world space resizing stimulus, sphere space rotation stimulus, sphere space translation stimulus, sphere space resizing stimulus, display space rotation stimulus, display space translation stimulus, and/or display space resizing stimulus. The method also may include instantiating on the processor an exception controller, the exception controller being adapted to manifest a world space rotation response, world space translation response, world space resizing response, sphere space rotation response, sphere space translation response, sphere space resizing response, display space rotation response, display space translation response, and/or display space resizing response, respectively in response to the world space rotation stimulus, world space translation stimulus, world space resizing stimulus, sphere space rotation stimulus, sphere space translation stimulus, sphere space resizing stimulus, display space rotation stimulus, display space translation stimulus, and/or display space resizing stimulus. The world space rotation response includes a rotation of the world space relative to the viewer not corresponding with the rotation by the viewer, the world space rotation response includes a translation of the world space relative to the viewer not corresponding with the translation by the viewer, and the world space resizing response includes a change in size of the world space relative to the viewer. The sphere space rotation response includes a rotation of the sphere space relative to the viewer not corresponding with the rotation by the viewer, the sphere space rotation response includes a translation of the sphere space relative to the viewer not corresponding with the translation by the viewer, and the sphere space resizing response includes a change in size of the sphere space relative to the viewer. The display space rotation response includes a rotation of the display space relative to the viewer not corresponding with the rotation by the viewer, the display space rotation response includes a translation of the display space relative to the viewer not corresponding with the translation by the viewer, and the display space resizing response includes a change in size of the display space relative to the viewer.

The world space rotation stimulus may include a user input. The world space rotation stimulus may include a voice command, a hand posture, a hand gesture, a stylus posture, a stylus gesture, an eye gesture, and/or a brainwave modulation. The world space translation stimulus may include a user input. The world space translation stimulus may include at least one of a voice command, a hand posture, a hand gesture, a stylus posture, a stylus gesture, an eye gesture, and a brainwave modulation. The world space resizing stimulus may include a user input. The world space resizing stimulus may include a voice command, a hand posture, a hand gesture, a stylus posture, a stylus gesture, an eye gesture, and/or a brainwave modulation. The sphere space rotation stimulus may include a user input. The sphere space rotation stimulus may include a voice command, a hand posture, a hand gesture, a stylus posture, a stylus gesture, an eye gesture, and/or a brainwave modulation. The sphere space translation stimulus may include a user input. The sphere space translation stimulus may include a voice command, a hand posture, a hand gesture, a stylus posture, a stylus gesture, an eye gesture, and/or a brainwave modulation. The sphere space resizing stimulus may include a user input. The sphere space resizing stimulus may include a voice command, a hand posture, a hand gesture, a stylus posture, a stylus gesture, an eye gesture, and/or a brainwave modulation. The display space rotation stimulus may include a user input. The display space rotation stimulus may include a voice command, a hand posture, a hand gesture, a stylus posture, a stylus gesture, an eye gesture, and/or a brainwave modulation. The display space translation stimulus may include a user input. The display space translation stimulus may include a voice command, a hand posture, a hand gesture, a stylus posture, a stylus gesture, an eye gesture, and/or a brainwave modulation. The display space resizing stimulus may include a user input. The display space resizing stimulus may include a voice command, a hand posture, a hand gesture, a stylus posture, a stylus gesture, an eye gesture, and/or a brainwave modulation.

The translation by the user may include constructive translation. The rotation by the user may include constructive rotation.

BRIEF DESCRIPTION OF THE SEVERAL VIEWS OF THE DRAWINGS

Like reference numbers generally indicate corresponding elements in the figures.

DETAILED DESCRIPTION OF THE EMBODIMENT

The present embodiment includes or at least may include multiple interface modes. As each such mode may include unique features and/or behaviors, modes are initially described individually herein for clarity.

Figure 1A:
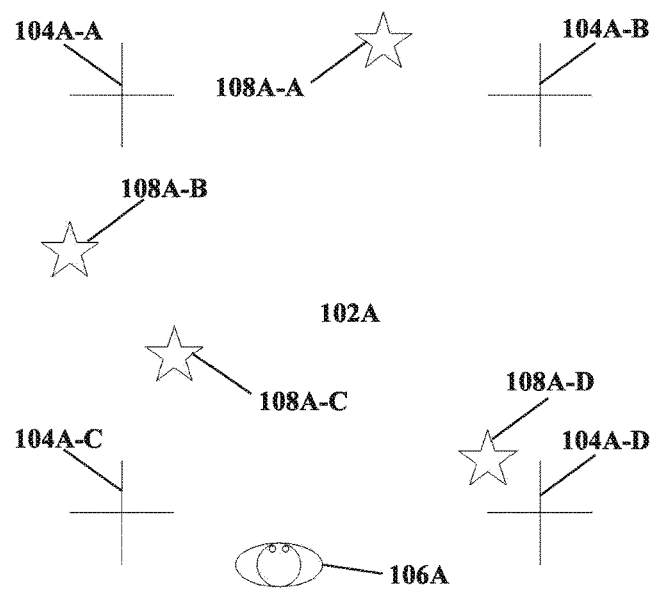
FIG. 1A shows an embodiment of a world space mode of an interface according to the present embodiment, with a viewer disposed therein.

With reference to FIG. 1A, a top-down view of an example embodiment of a world space mode of an interface according to the present embodiment is shown therein. The world space proper in the example of FIG. 1A is identified as 102A. The world space 102A is not shown as being bounded, and in at least some embodiments the world space 102A may not be bounded or may have boundaries that are not well-defined. Such an arrangement may resemble in at least some senses that of a physical world, wherein the boundaries thereof may not necessarily be well-defined. Considering the Earth as an example, the surface thereof is certainly finite but is at least arguably unbounded, at least insofar as the Earth is considered as a surface since it is possible to translate and/or rotate indefinitely on the surface of the Earth without leaving the Earth. Furthermore, the world space 102A may not be a tangible "thing" per se, but rather may be considered as a space, environment, and/or portion of an environment. That is, the world space 102A may be considered as a place, e.g. a place that enables content to be disposed therein, that supports user actions (and/or potentially enables user actions to be processed as system inputs), that enables expression of system events and/or outputs, etc. The world space 102A might also be considered to be a collection of rules, behaviors, etc. that define the manner by which interaction between a user and a system (and potentially content associated with the world space 102A within the system, etc.) may be carried out. Although the world space 102A is labeled in FIG. 1A for clarity, in practice a world space 102A will not necessarily have any visible presence or otherwise be directly sensible to a user thereof (though visibility is not excluded).

Depending upon the particular embodiment, world space 102A may be or include, in whole or in part, a virtual environment, an augmented reality environment, a physical environment, or some other environment (e.g. an abstract digital construct with no geometry to output).

Four registration marks 104A-B, 104A-B, 104A-C, and 104A-D are shown in FIG. 1A. The registration marks 104A-A through 104A-D are shown herein for illustrative purposes, so as to make certain translations, rotations, etc. more readily apparent. Registration marks 104A-A through 104A-D may or may not be present at all in actual embodiments of world space 102A, and when present may or may not be visible.

A user or viewer 106A of the interface is shown disposed within world space 102A. Depending on the particulars of a given embodiment, the viewer 106A may be physically present within world space 102A, may be represented within world space 102A by a virtual reality and/or augmented reality avatar, and/or may exist within world space 102 as a point of view with no physical form and/or no visible appearance. For clarity, the viewer 106A is shown in FIG. 1A (and elsewhere herein, unless otherwise noted) as a physical human presence, but this is an example only and other arrangements may be equally suitable.

In addition, several example entities 108A-B, 108A-B, 108A-C, and 108A-D are shown disposed within world space 102A. With regard to the present embodiment, the term "entity" encompasses constructs that represent one or more objects, phenomena, locales, environments, etc., as disposed within one or more spaces (e.g. world space 102A). Depending on the particulars of an embodiment and the spaces therein, entities 108A-B through 108A-D may be physical entities, virtual reality entities, augmented reality entities, and/or other entities (e.g. a freestanding light effect or hologram, which might in some circumstances arguably be considered non-physical even if the light thereof exists within physical reality).

The entities 108A-B through 108A-D as shown in FIG. 1A are present only for illustrative purposes, and are not meant to visually represent any particular entity. However, as a more concrete example, for a world space 102A of a virtual environment, entities 108A-B through 108A-D might include but are not limited to text, images, icons for data files and/or programs, virtual objects appropriate to some virtual environment (e.g. a virtual treasure chest in a pirate game), images, sounds, lighting effects and/or other visual effects, wireframes, models, avatars e.g. representing other users, virtual persons, virtual creatures, etc. The aforementioned are examples only, and other arrangements may be equally suitable.

Notice should be taken of the approximate position and orientation of the viewer 106A in FIG. 1A within world space 102A, with respect to the registration marks 104A-A through 104A-D and the entities 108A-B through 108A-D.

Figure 1B:
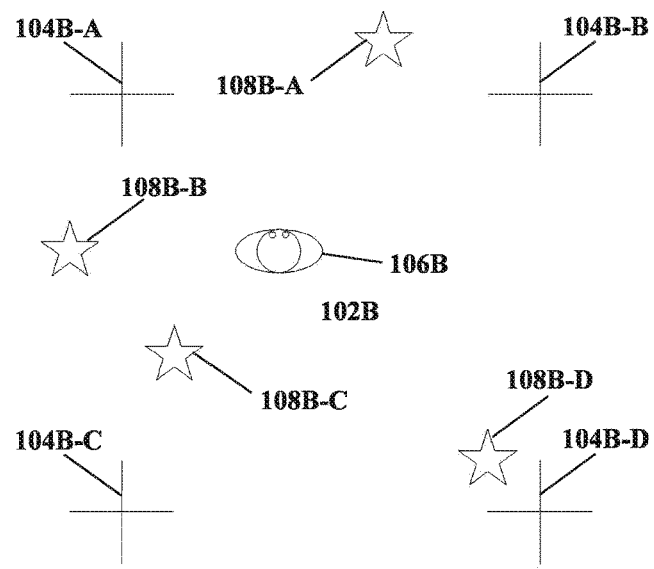
FIG. 1B shows an example embodiment of a world space mode of an interface according to the present embodiment, following a translation of the viewer therein.
Figure 1C:
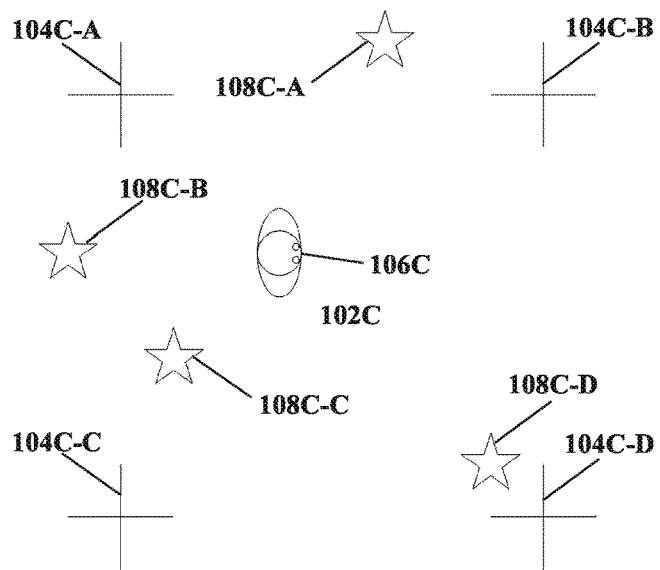
FIG. 1C shows an example embodiment of a world space mode of an interface according to the present embodiment, following a rotation of the viewer therein.

Turning now to FIG. 1B, an arrangement similar to that in FIG. 1A is shown, but with the viewer 106B having translated forward some distance within world space 102B, as may be seen with respect to the registration marks 104B-A through 104B-D and the entities 108B-B through 108B-D therein.

Thus, as shown, translation of the viewer 106B—for example with respect to some external coordinate system, including but not limited to a coordinate system associated with the physical world—substantially corresponds with translation with respect to world space 102B. The direction and distance of translation by the viewer 106B corresponds substantially with the direction and distance that the viewer moves (and/or for certain embodiments may appear to move) within and/or with respect to world space 102B. More simply, as the viewer 106B translates, the viewer 106B translates within world space 102B.

Likewise, for entities 108B-A through 108B-D disposed within world space 102B, and that are stationary within world space 102B, translation of the viewer 106B substantially corresponds with translation with respect to those entities 108B-A through 108B-D. Again, as the viewer 106B translates, the viewer 106B translates through the entities 108B-A through 108B-D in world space 102B.

For example, considering entities 108B-A through 108B-D, as the viewer 106B translates the distance between the viewer 106B and each entity 108B-A through 108B-D will change as though the viewer 106B were moving with respect to the entities 108B-A through 108B-D. Similarly, the direction from the viewer 106B to each of the entities 108B-A through 108B-D will change as though the viewer 106B were moving with respect to the entities 108B-A through 108B-D.

Thus, for example for purposes of vision, for any of entities 108B-A through 108B-D that are within the field of view of the viewer 106B, the apparent position of those entities 108B-A through 108B-D within that field of view, the apparent size of those entities 108B-A through 108B-D appear, what facings (if any) of those entities 108B-A through 108B-D (for arrangements wherein one or more of entities 108B-A through 108B-D have multiple facings, e.g. if one or more of entities 108B-A through 108B-D is a 3D object), etc. will vary in a manner substantially corresponding with a translation by the viewer 106B with respect to world space 102B.

Although the entities 108B-A through 108B-D in the example of FIG. 1B are shown to be stationary for purposes of simplicity, the present embodiment is not limited only to stationary entities. It will be understood that motions of entities within world space 102B also may impact apparent positions, motions, etc. with respect to the viewer 106B.

Also, although FIG. 1B shows translation only in two dimensions, the present embodiment is not limited only to two dimensions. Viewers 106B may translate in three dimensions, with substantially corresponding three-dimensional translation with respect to world space 102B and/or to entities 108B-A through 108B-D disposed therein.

Further, with regard to the use of the term "translation" (and subsequently also "rotation", below), for at least some embodiments the viewer 106B may, in fact, be moving with respect to an external coordinate system and/or with respect to world space 102B. However, arrangements wherein the viewer 106B does not move also may be equally suitable. For example, insofar as the viewer 106B and the world space 102B are concerned, an arrangement wherein the viewer 106B has moved forward with respect to the world space 102B is similar to an arrangement wherein the world space 102B has moved backward with respect to the viewer 106B. Arrangements wherein the world space 102B moves in addition to or instead of the viewer 106B might be useful, for example, in outputting an apparently large virtual environment for a viewer whose physical body is disposed within a smaller physical environment. By moving the environment relative to the viewer, the need for the viewer to move (i.e. with respect to the physical world) may be reduced or even eliminated. However, other arrangements may be equally suitable.

Figure 10:
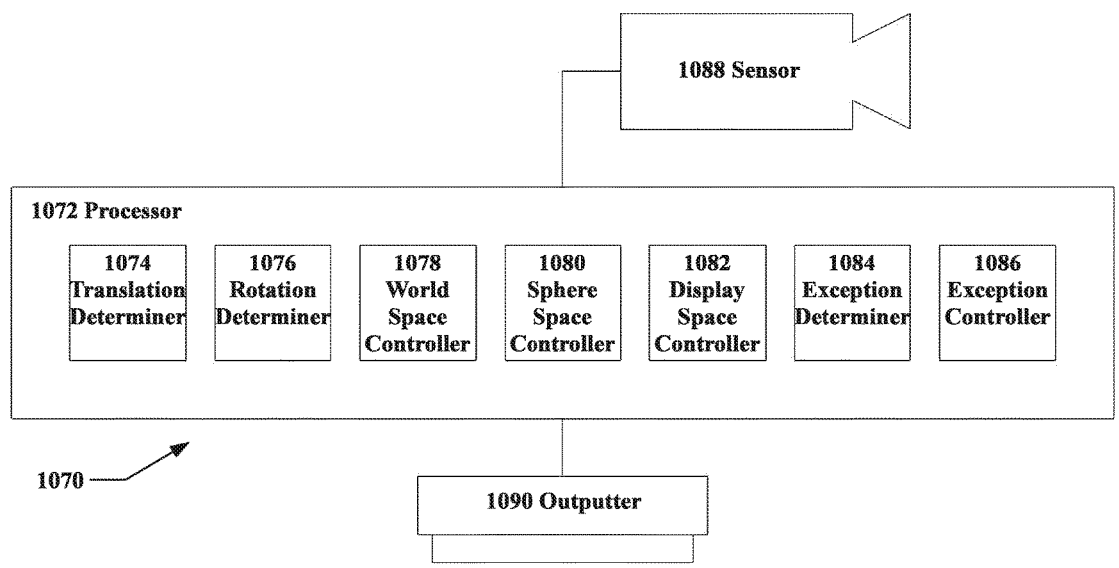
FIG. 10 shows another embodiment of an apparatus according to the present embodiment in schematic form, with support for enabling exceptions to default interaction behavior.

Moving on, FIG. 10 shows an arrangement similar to that in FIG. 1B, but with the viewer 106C having rotated clockwise approximately 90 degrees within world space 102C, as may be seen with respect to the registration marks 104C-A through 104C-D and the entities 108C-B through 108C-D therein.

Thus, as shown, rotation of the viewer 106C substantially corresponds with rotation with respect to world space 102C. The direction and degree of rotation by the viewer 106C correspond substantially with the direction and distance that the viewer rotates (and/or for certain embodiments may appear to rotate) within and/or with respect to world space 102C. More simply, as the viewer 106C rotates, the viewer 106C rotates within world space 102C.

Likewise, for entities 108C-A through 108C-D disposed within world space 102C, and that are stationary within world space 102C, rotation of the viewer 106C substantially corresponds with rotation with respect to those entities 108C-A through 108C-D.

Although FIG. 10 shows rotation in a particular two-dimensional plane (i.e. a plane generally parallel to the ground), the present embodiment is not limited only to two dimensions. Viewers 106C may rotate in three dimensions, with substantially corresponding three-dimensional rotation with respect to world space 102C and/or to entities 108C-A through 108C-D disposed therein.

With regard to the translation and rotation of the viewer, both with reference to FIG. 1A through FIG. 10 and elsewhere herein, the terms "translation" and "rotation" should be understood broadly at least insofar as physical translation and/or rotation are concerned. For example, consider the case of a mechanism or system that allows a user to walk or otherwise move while remaining in place. Such a system might be combined with a virtual reality and/or augmented reality environment, allowing a user to navigate through the virtual or augmented reality environment using natural walking motions, without the user necessarily moving through the physical world. Put differently, a viewer might execute motions comparable to the motions associated with a walking-based translation, while remaining substantially in the same location within physical space. The term "constructive translation" might usefully be applied to describe such action. The term "constructive rotation" likewise might be applied to similar action directed toward rotation without necessarily being associated with actual rotation in physical space.

Even though a viewer engaging in constructive translation may not translate in physical space, constructive translation may for at least some embodiments still be recognizable as a translation for the purposes of the present embodiment and could be utilized and/or interpreted as input comparable to actual translation within physical space. That is, even if a viewer does not translate in physical space, e.g. in the sense of walking from one point to another in a physical room or other space, the present embodiment may still consider and/or interpret certain inputs—constructive translation—to be equivalent to translation. Thus, the constructive translation could still invoke a substantially corresponding translation with respect to world space. Constructive rotation likewise could still invoke a substantially corresponding rotation with respect to world space.

As a more extreme example, consider a case wherein a user might execute nerve signals associated with walking, running, etc. without necessarily even making the associated physical motions of his or her own body. Such an arrangement might be utilized for example by users suffering from partial and/or full paralysis of certain body parts, during physical therapy, etc. In such case, the nerve impulses sent to the muscles might themselves be considered to produce a constructive translation and/or constructive rotation for the purposes of the present embodiment, regardless of whether any physical body motion at all takes place. Potentially the nerve signals might be so interpreted as constructive translation and/or rotation even if those nerve signals do not reach the relevant muscles, and/or even if those nerve signals never leave the brain (e.g. due to certain spinal or neurological conditions).

In view of this, the present embodiment is not necessarily limited to actual translation and/or rotation within physical space. Constructive translation, constructive rotation, etc. may for at least some embodiments of the present embodiment be equally suitable for the purposes of the present embodiment, and unless otherwise specified the terms "translation" and "rotation" should be considered to encompass therein constructive translation and constructive rotation, respectively.

Figure 2A:
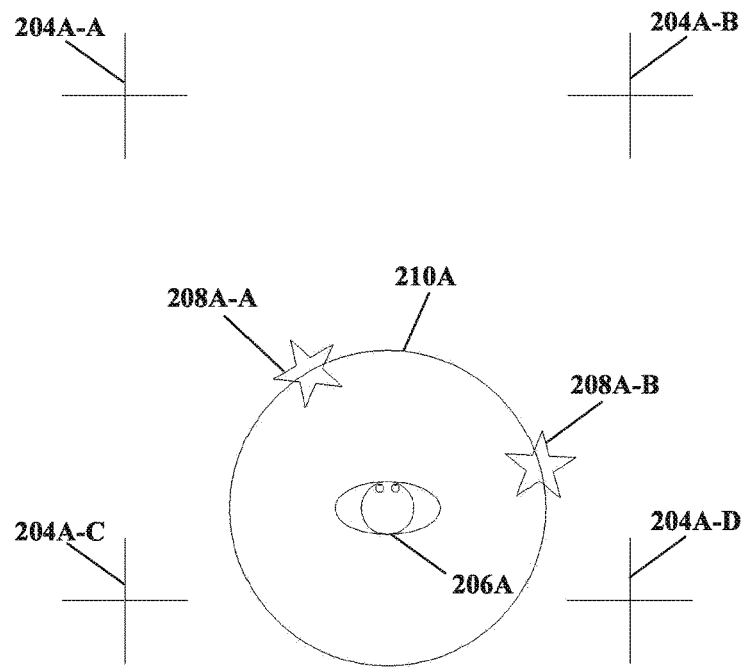
FIG. 2A shows an example embodiment of a sphere space mode of an interface according to the present embodiment, with a viewer therein.

Moving on to FIG. 2A, a top-down view of an example embodiment of a sphere space mode of an interface according to the present embodiment is shown therein. The sphere space in FIG. 2A is identified as 210A, indicated by a circle (representing a three-dimensional sphere). As described previously with regard to world space, sphere space 210A may not be a tangible thing, but rather may be considered as a space, environment, and/or portion of an environment. Like world space, sphere space 210A may be considered to be a place that enables content to be disposed therein, that supports user actions (and/or potentially enables user actions to be processed as system inputs), that enables expression of system events and/or outputs, etc. Also like world space, sphere space 210A may be considered to be a collection of rules, behaviors, etc. that define the manner by which interaction between a user and a system (and potentially content associated with sphere space 210A within the system, etc.) may be carried out. Although the sphere space 210A is labeled in FIG. 2A for clarity, in practice a sphere space 210A will not necessarily have any visible presence or otherwise be directly sensible to a user thereof (though visibility is not excluded).

Depending upon the particular embodiment, sphere space 210A may be or include, in whole or in part, a virtual environment, an augmented reality environment, a physical environment, or some other environment (e.g. an abstract digital construct with no geometry to output).

Despite the name "sphere space", it is emphasized that sphere space 210A is not required to be a sphere, and may or may not be spherical in form. Typically, though not necessarily, sphere space 210A may be defined at least partially in terms of one or more spheres and/or spherical shell, with content disposed within such spheres and/or engaged with such spherical shells. For example, the arrangement illustrated in FIG. 2A shows a sphere space 210A in the form of a spherical shell with content engaged therewith. However other shapes, including but not limited to planes, cylinders, cubes, etc. may be equally suitable. Moreover, sphere space 210A is not required to have any defined geometry; sphere space is distinguished from, for example, world space not necessarily by shape or by other geometric parameters but rather by behavior and/or functionality, that is, how sphere space (and/or content disposed therein) reacts in response to factors including but not limited to viewer translation, viewer rotation, etc.

Returning to FIG. 2A, four registration marks 204A-B, 204A-B, 204A-C, and 204A-D are shown therein. The registration marks 204A-A through 204A-D are shown herein for illustrative purposes, so as to make certain translations, rotations, etc. more readily apparent. Registration marks 204A-A through 204A-D may or may not be present at all in actual embodiments of sphere space 210A, and when present may or may not be visible.

A user or viewer 206A of the interface is shown disposed within sphere space 210A. In addition, two example entities 208A-A and 208A-B are shown disposed within sphere space 210A.

Notice should be taken of the approximate position and orientation of the viewer 206A in FIG. 2A within sphere space 210A, with respect to the registration marks 204A-A through 204A-D and the entities 208A-B and 208A-B.

Figure 2B:
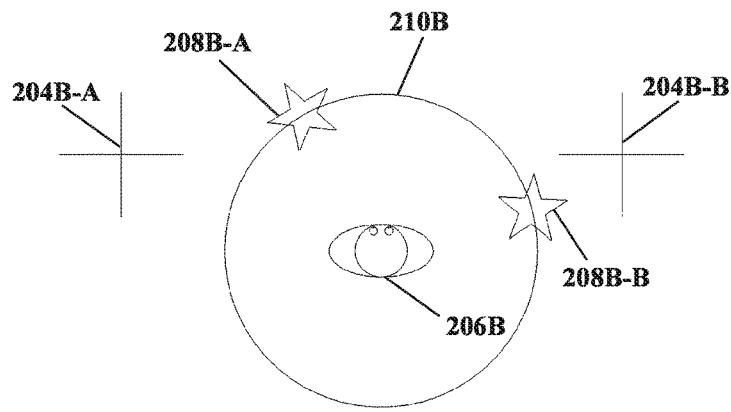
FIG. 2B shows an example embodiment of a sphere space mode of an interface according to the present embodiment, following a translation of the viewer therein.

Turning now to FIG. 2B, an arrangement similar to that in FIG. 2A is shown, but with the viewer 206B having translated forward as may be seen with respect to the registration marks 204B-A through 204B-D. However, although the viewer 206B has translated with respect to the registration marks 204B-A through 204B-D, the viewer 206B has not translated with respect to sphere space 210B or with respect to the entities 208B-A and 208B-B disposed within sphere space 210B.

Rather, as may be seen, the arrangement of the viewer 206B with respect to both sphere space 210B and the entities 208B-A and 208B-B disposed within sphere space 210B is substantially unchanged. Translation by the viewer 206B thus corresponds with substantially zero translation with respect to sphere space 210B. More simply, even if the viewer 206B translates, the viewer 206B does not translate within or with respect to sphere space 210B, and the viewer 206B does not translate with respect to entities 208B-A and 208B-B disposed within sphere space 210B. Put differently, sphere space 210B and entities 208B-A and 208B-B therein translate with a viewer 206B as that viewer 206B translates.

Figure 2C:
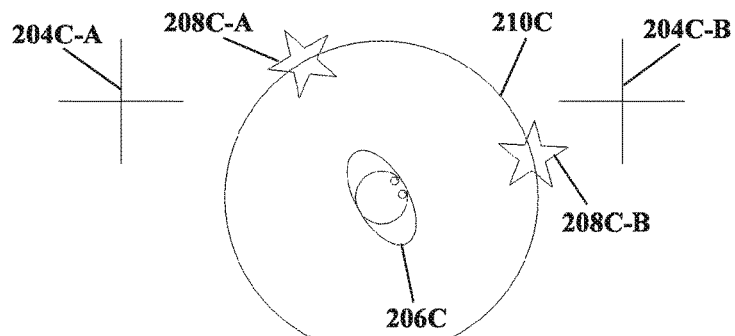
FIG. 2C shows an example embodiment of a sphere space mode of an interface according to the present embodiment, following a rotation of the viewer therein.

Moving on, FIG. 2C shows an arrangement similar to that in FIG. 2B, but with the viewer 206C having rotated clockwise approximately 60 degrees as may be seen with respect to the registration marks 204C-A through 204C-D. In addition, it may be seen that the viewer 206C also has rotated clockwise approximately 60 degrees with respect to the entities 208C-A and 208C-B therein, and thus also with respect to sphere space 210C.

Thus, as shown, rotation of the viewer 206C substantially corresponds with rotation with respect to sphere space 210C. The direction and degree of rotation by the viewer 206C corresponds substantially with the direction and distance that the viewer rotates within and/or with respect to sphere space 210C. More simply, as the viewer 206C rotates, the viewer 206C rotates within sphere space 210C. Likewise, for entities 208C-A and 208C-B disposed within sphere space 210C, and that are stationary within sphere space 210C, rotation of the viewer 206C substantially corresponds with rotation with respect to those entities 208C-A and 208C-B.

Figure 3A:
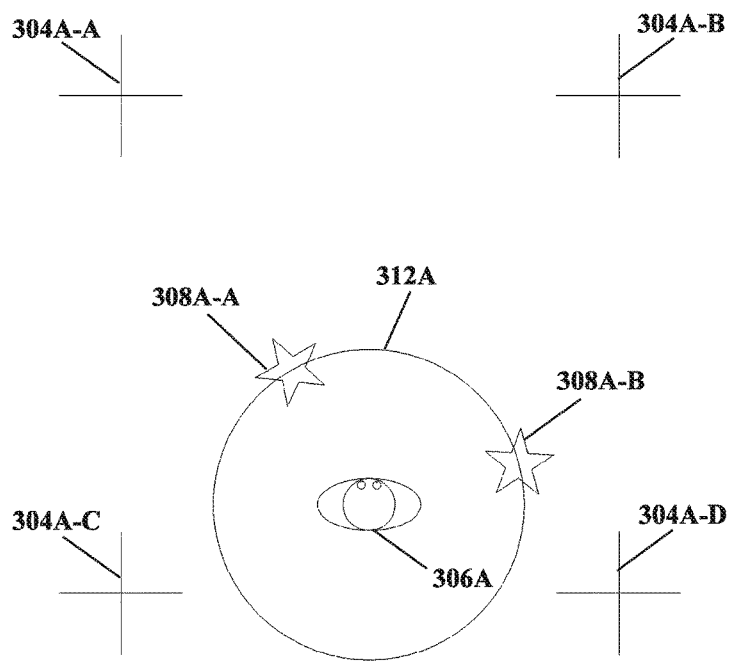
FIG. 3A shows an example embodiment of a display space mode of an interface according to the present embodiment, with a viewer therein.

Turning now to FIG. 3A, a top-down view of an example embodiment of a display space mode of an interface according to the present embodiment is shown therein. The display space in FIG. 3A is identified as 312A, indicated by a circle (representing a three-dimensional sphere). As described previously with regard to world space and sphere space, display space 312A may not be a tangible thing, but rather may be considered as a space, environment, and/or portion of an environment. Like world space and sphere space, display space 312A may be considered to be a place that enables content to be disposed therein, that supports user actions (and/or potentially enables user actions to be processed as system inputs), that enables expression of system events and/or outputs, etc. Also like world space and sphere space, display space 312A may be considered to be a collection of rules, behaviors, etc. that define the manner by which interaction between a user and a system (and potentially content associated with display space 312A within the system, etc.) may be carried out. Although the display space 312A is labeled in FIG. 3A for clarity, in practice a display space 312A will not necessarily have any visible presence or otherwise be directly sensible to a user thereof (though visibility is not excluded).

Depending upon the particular embodiment, display space 312A may be or include, in whole or in part, a virtual environment, an augmented reality environment, a physical environment, or some other environment (e.g. an abstract digital construct with no geometry to output).

Display space 312A may be defined at least partially in terms of one or more geometrical forms such as a sphere, a spherical shell, a plane, etc., with content disposed therein and/or thereon. For example, the arrangement illustrated in FIG. 3A shows a display space 312A in the form of a spherical shell with content engaged therewith. However other shapes, including but not limited to planes, cylinders, cubes, etc. may be equally suitable. Moreover, display space 312A is not required to have any defined geometry; display space is distinguished from, for example, world space and/or sphere space not necessarily by shape or by other geometric parameters but rather by behavior and/or functionality, that is, how display space (and/or content disposed therein) reacts in response to factors including but not limited to viewer translation, viewer rotation, etc.

Figure 3B:
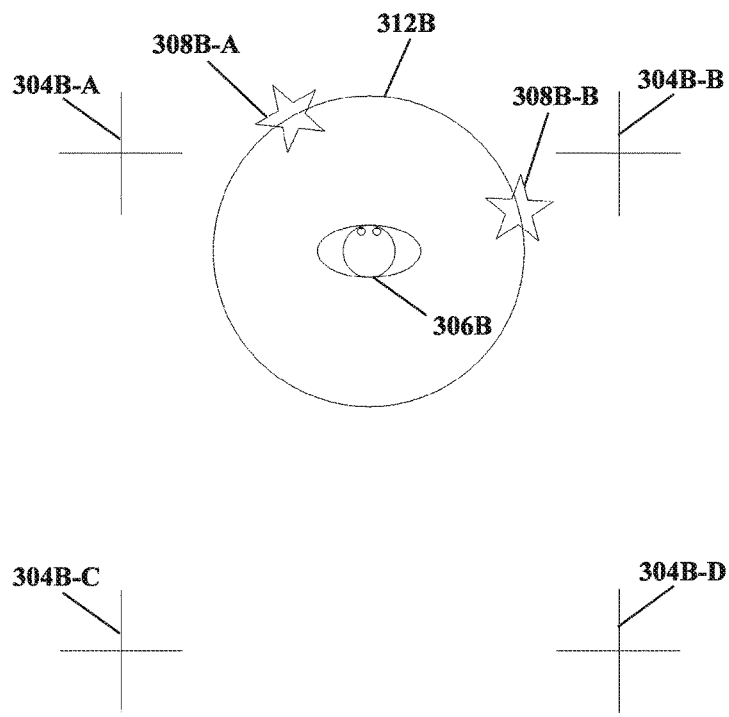
FIG. 3B shows an example embodiment of a display space mode of an interface according to the present embodiment, following a translation of the viewer therein.
Figure 3C:
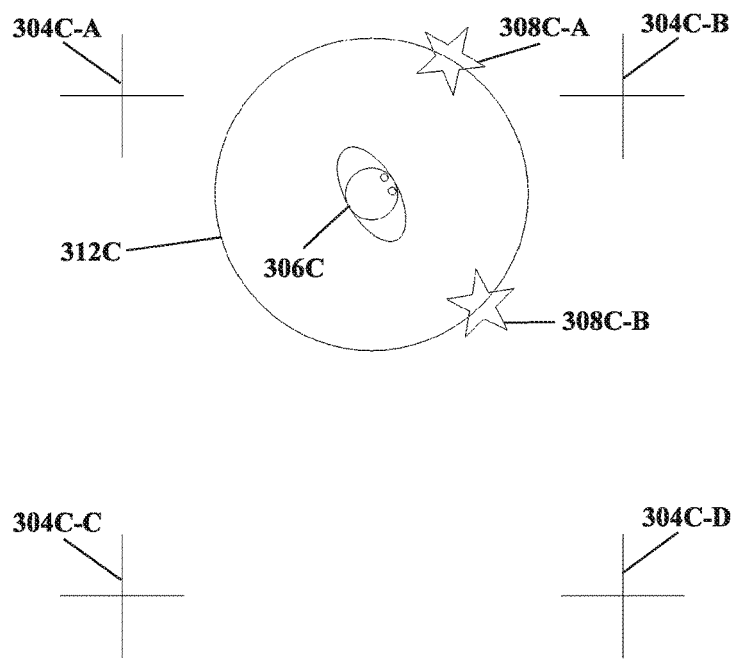
FIG. 3C shows an example embodiment of a display space mode of an interface according to the present embodiment, following a rotation of the viewer therein.

Although sphere space as show in FIG. 2A through FIG. 2C and display space as shown in FIG. 3A through FIG. 3C are illustrated similarly, i.e. as being generally circular in form, this is an example only. It is not required that sphere space and display space will have similar geometry or form (if either or both has geometry or form at all, as noted above).

Returning to FIG. 3A, four registration marks 304A-B, 304A-B, 304A-C, and 304A-D are shown therein. The registration marks 304A-A through 304A-D are shown herein for illustrative purposes, so as to make certain translations, rotations, etc. more readily apparent. Registration marks 304A-A through 304A-D may or may not be present at all in actual embodiments of display space 310A, and when present may or may not be visible.

A user or viewer 306A of the interface is shown disposed within display space 312A. In addition, two example entities 308A-A and 308A-B are shown disposed within display space 312A.

Notice should be taken of the approximate position and orientation of the viewer 306A in FIG. 3A within display space 312A, with respect to the registration marks 304A-A through 304A-D and the entities 308A-A and 308A-B.

Turning now to FIG. 3B, an arrangement similar to that in FIG. 3A is shown, but with the viewer 306B having translated forward as may be seen with respect to the registration marks 304B-A through 304B-D. However, although the viewer 306B has translated with respect to the registration marks 304B-A through 304B-D, the viewer 306B has not translated with respect to display space 312B or with respect to the entities 308B-A and 308B-B disposed within display space 312B.

Rather, as may be seen, the arrangement of the viewer 306B with respect to both display space 312B and the entities 308B-A and 308B-B disposed within display space 312B is substantially unchanged. Translation by the viewer 306B thus corresponds with substantially zero translation with respect to display space 312B. More simply, even if the viewer 306B translates, the viewer 306B does not translate within or with respect to display space 312B, and the viewer 306B does not translate with respect to entities 308B-A and 308B-B disposed within display space 312B. Put differently, display space 312B and entities 308B-A and 308B-B therein translate with a viewer 306B as that viewer 306B translates.

Moving on, FIG. 3C shows an arrangement similar to that in FIG. 3B, but with the viewer 306C having rotated clockwise approximately 60 degrees as may be seen with respect to the registration marks 304C-A through 304C-D. However, although the viewer 306C has rotated with respect to the registration marks 304B-A through 304B-D, the viewer 306C has not rotated with respect to display space 312C or with respect to the entities 308C-A and 308C-B disposed within display space 312C.

Rather, as may be seen, the arrangement of the viewer 306C with respect to both display space 312C and the entities 308C-A and 308C-B disposed within display space 312C is substantially unchanged. Rotation by the viewer 306C thus corresponds with substantially zero rotation with respect to display space 312C. More simply, even if the viewer 306C rotates, the viewer 306C does not rotate within or with respect to display space 312C, and the viewer 306C does not rotate with respect to entities 308C-A and 308C-B disposed within display space 312C. Put differently, display space 312C and entities 308C-A and 308C-B therein rotate with a viewer 306C as that viewer 306C rotates.

It may be useful to briefly sum certain behaviors as thus far described with respect to world space, sphere space, and display space.

For world space, translation by a viewer substantially corresponds with translation with respect to world space, and rotation by the viewer substantially corresponds with rotation with respect to world space. In other words, a viewer typically translates through world space and rotates within world space, so that changes in the appearance and/or position of entities (and potentially world space itself, if visible) may result from translation and/or rotation.

For sphere space, translation by a viewer corresponds with substantially zero translation with respect to sphere space, and rotation by the viewer substantially corresponds with rotation with respect to the sphere space. In other words, sphere space typically translates with a viewer, while the viewer rotates within sphere space, so that changes in the appearance and/or position of entities (and potentially sphere space itself, if visible) may result from the rotation, but not from translation. From the point of view of the viewer, sphere space remains substantially aligned with the viewer as the viewer moves, but the viewer may rotate within sphere space to view different portions thereof.

For display space, translation by a viewer corresponds with substantially zero translation with respect to sphere space, and rotation by the viewer corresponds with substantially zero rotation with respect to the display space. In other words, display space typically translates and rotates with a viewer, so that changes in the appearance and/or position of entities (and potentially display space itself, if visible) typically do not result from either translation or rotation. From the point of view of the viewer, display space remains substantially aligned with the viewer as the viewer moves and as the viewer rotates.

Figure 3D:
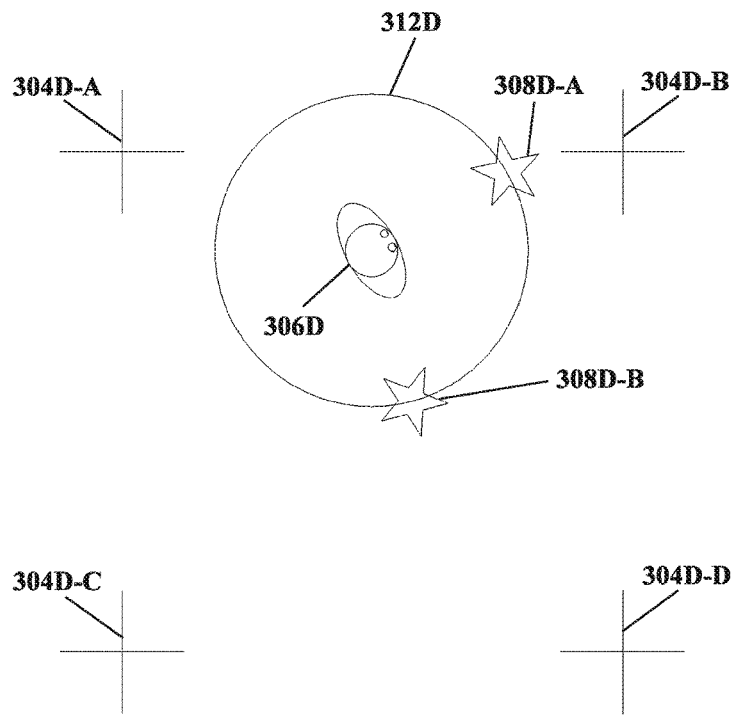
FIG. 3D shows an example embodiment of a display space mode of an interface according to the present embodiment, following a rotation of the display space.

However, as may be seen with respect to FIG. 3D, the aforementioned behaviors are not necessarily entirely fixed. The behaviors as previously described with regard to world space, sphere space, and display space might for at least some embodiments be more properly considered to be default behaviors rather than absolute restrictions. Under certain circumstances for at least some embodiments, other behaviors may be exhibited.

FIG. 3D shows an arrangement similar to that in FIG. 3C, but with display space 312D having rotated clockwise approximately 30 degrees as compared with FIG. 3C, as may be seen with respect to the registration marks 304D-A through 304D-D. It is also noted that the viewer 306D in FIG. 3D is substantially unchanged compared with FIG. 3C. That is, display space 312D has rotated without the viewer 306D having rotated.

As previously described, typically display space 312D rotates with the viewer 306D, such that there is substantially zero relative rotation of the display space 312D with respect to the viewer 306D. However, for at least some embodiments it may be useful to enable rotation of the display space 312D with respect to the viewer 306D, under at least some circumstances. For example, if display space 312D includes an informational entity that indicates and/or displays incoming messages, it may be useful to dispose such an entity in display space such that the entity is in the viewer's peripheral vision; the viewer may be made aware (e.g. through blinking or some other phenomenon sensible via peripheral vision) that a messages has been received, without the message necessarily obscuring the viewer's vision for other tasks (e.g. crossing a busy street). With the message entity in display space, regardless of how the viewer translates and/or rotates the message entity may remain in his or her peripheral visual field (neither obscuring central vision nor leaving the visual field altogether). However, if at some point the viewer wishes to stop and read an incoming message, it may be useful to enable rotation of the display space, so that the viewer may move the message entity into his or her central vision to be read.

Such an arrangement might be considered to be a suspension or an "override" of the default behavior of the display space. Enabling rotation of the display space as described would not necessarily alter the more general behavior of the display space as described previously with regard to FIG. 3A through FIG. 3C, but could rather allow for an exception to the default behavior.

For embodiments wherein such exceptions are utilized, it may further be useful to arrange to invoke such exceptions using some stimulus. For example, a display rotation stimulus (i.e. to produce rotation of a display space relative to a viewer) might include a user input. More particularly, a display rotation stimulus might include but is not necessarily limited to, a voice command, a hand posture or gesture, a stylus posture or gesture, an eye posture or gesture, or even a modulation of a viewer's brainwave pattern. These are examples only, and other stimuli may be equally suitable, e.g. mechanical inputs such as keyboard commands.

Figure 3E:
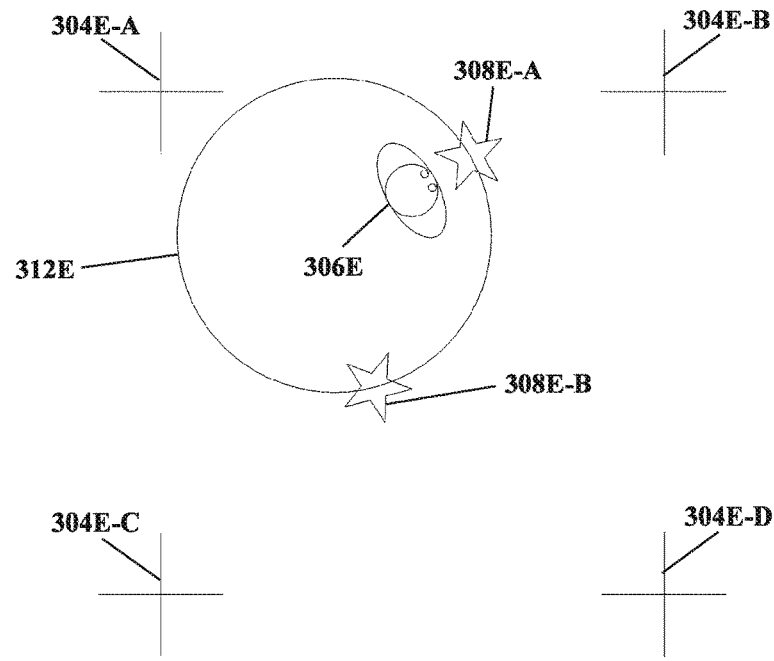
FIG. 3E shows an example embodiment of a display space mode of an interface according to the present embodiment, following a translation of the display space.

As may be seen with regard to FIG. 3E, exceptions to the default behavior for display space are not necessarily limited only to rotations.

FIG. 3E shows an arrangement similar to that in FIG. 3D, but with display space 312E having translated downward and to the left as compared with FIG. 3D, as may be seen with respect to the registration marks 304E-A through 304E-D. It is also noted that the viewer 306E in FIG. 3E is substantially unchanged compared with FIG. 3D. That is, display space 312E has translated without the viewer 306E having translated.

As previously described, typically display space 312E translates with the viewer 306E, such that there is substantially zero relative translation of the display space 312E with respect to the viewer 306E. However, for at least some embodiments it may be useful to enable translation of the display space 312E with respect to the viewer 306E, under at least some circumstances.

For embodiments wherein such exceptions are utilized, it may further be useful to arrange to invoke such exceptions using some stimulus. For example, a display translation stimulus (i.e. to produce a translation of a display space relative to a viewer) might include a user input. More particularly, a display translation stimulus might include but is not necessarily limited to, a voice command, a hand posture or gesture, a stylus posture or gesture, an eye posture or gesture, or even a modulation of a viewer's brainwave pattern. These are examples only, and other stimuli may be equally suitable, e.g. mechanical inputs such as keyboard commands.

In addition, it is noted that exceptions are not limited only to positive changes. For example, while typically translation by a viewer may produce a corresponding translation within world space (as noted with regard to FIG. 3B), for at least certain embodiments it may be desirable for translation by a viewer not to produce corresponding translation within world space. As a more concrete example, consider a viewer interacting with world space within a moving vehicle such as an automobile. The viewer may be moving within the physical environment at highway speeds (e.g. 65 miles per hour). It may not necessarily be desirable in all instances for the viewer to likewise move through a world space at such speeds. Thus, an exception to the typical world space behavior might be implemented. Such an exception may be triggered for example by a gesture, verbal command, etc. as a viewer boards a vehicle, but also might be partially or entirely automated, for example through communication with sensors on the vehicle that provide information regarding the motion of the vehicle (as distinct from the motion of the viewer within the vehicle), so as to automatically exclude vehicle translations from being expressed as substantially corresponding translations within world space.

Thus, for purposes of the present embodiment, a world space translation response of a translation of the world space relative to the viewer that does not correspond with the translation by the viewer should be understood to include (but not be limited to) any translation of world space relative to the viewer, positive or negative, not substantially corresponding with the translation by the viewer. This applies equally to exceptions for world space rotation, sphere space translation, sphere space rotation, display space translation, and display space rotation.

Figure 3F:
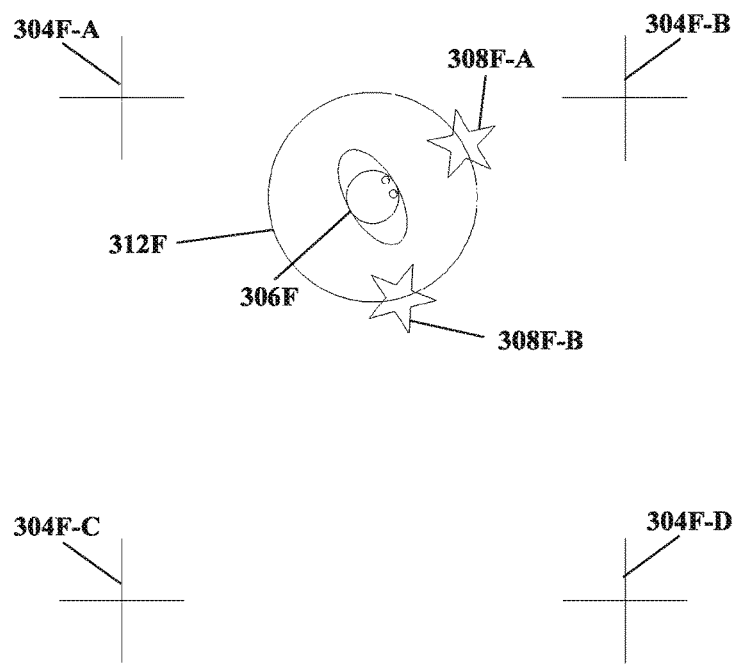
FIG. 3F shows an example embodiment of a display space mode of an interface according to the present embodiment, following a resizing of the display space.

Turning to FIG. 3F shows an arrangement similar to that in FIG. 3E, but with display space 312F having been resized, and more particularly having been made smaller, as compared with FIG. 3E, as may be seen with respect to the registration marks 304F-A through 304F-D. It is also noted that the viewer 306F in FIG. 3F is substantially unchanged compared with FIG. 3E. That is, display space 312F has been resized without the viewer 306F having been resized (as might be possible with a virtual avatar), translated, rotated, or otherwise having been visibly altered.

Although typically (though not necessarily) a display space may maintain a consistent size as a default behavior, for at least some embodiments it may be useful to enable resizing of the display space 312F with respect to the viewer 306F, under at least some circumstances.

For embodiments wherein such functionality is enabled, it may further be useful to arrange to invoke such functions using some stimulus. For example, a display resizing stimulus (i.e. to produce resizing of a display space relative to a viewer) might include a user input. More particularly, a display resizing stimulus might include but is not necessarily limited to, a voice command, a hand posture or gesture, a stylus posture or gesture, an eye posture or gesture, or even a modulation of a viewer's brainwave pattern. These are examples only, and other stimuli may be equally suitable, e.g. mechanical inputs such as keyboard commands.

It is emphasized that rotation, translation, and/or resizing as described are examples only. Such exceptional behaviors may be useful for certain embodiments but are not required. Moreover, other exceptional behaviors might be equally suitable, including but not limited to resizing entities in display space, making entities in display space invisible or less visible (e.g. by reducing opacity thereof), etc.

Furthermore, it will be understood that similar exceptions may be useful for at least some embodiments with regard to world space and/or sphere space. Thus, world rotation stimuli, world translation stimuli, world resizing stimuli, sphere rotation stimuli, sphere translation stimuli, sphere resizing stimuli, etc., may be utilized to similarly produce rotation, translation, resizing, etc. for world space and/or sphere space.

Figure 4A:
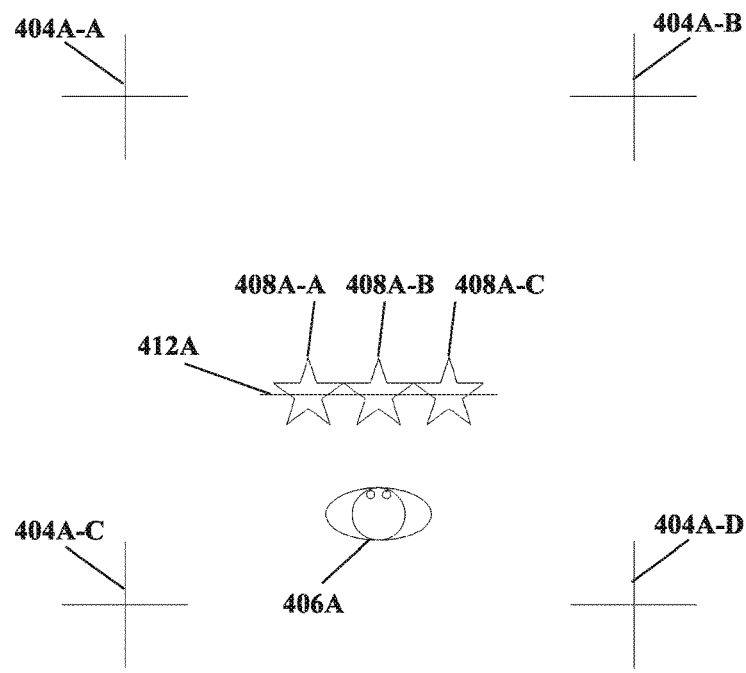
FIG. 4A shows another example embodiment of a display space mode of an interface according to the present embodiment, with a viewer therein.

Moving on to FIG. 4A, as previously stated display space, may take various forms (as may sphere space and world space). Where FIG. 3A shows a display space generally in the form of a spherical shell, FIG. 4A shows a display space 412A generally in the form of a finite plane disposed in front of a viewer 406A. Entities 408A-A, 408A-B, and 408A-C are disposed in display space. Registration marks 404A-A, 404A-B, 404A-C, and 404A-D also are shown for reference.

Notice should be taken of the approximate position and orientation of the viewer 406A in FIG. 4A with respect to display space 412A and with respect to the registration marks 404A-A through 404A-D and the entities 408A-B through 408A-C.

Figure 4B:
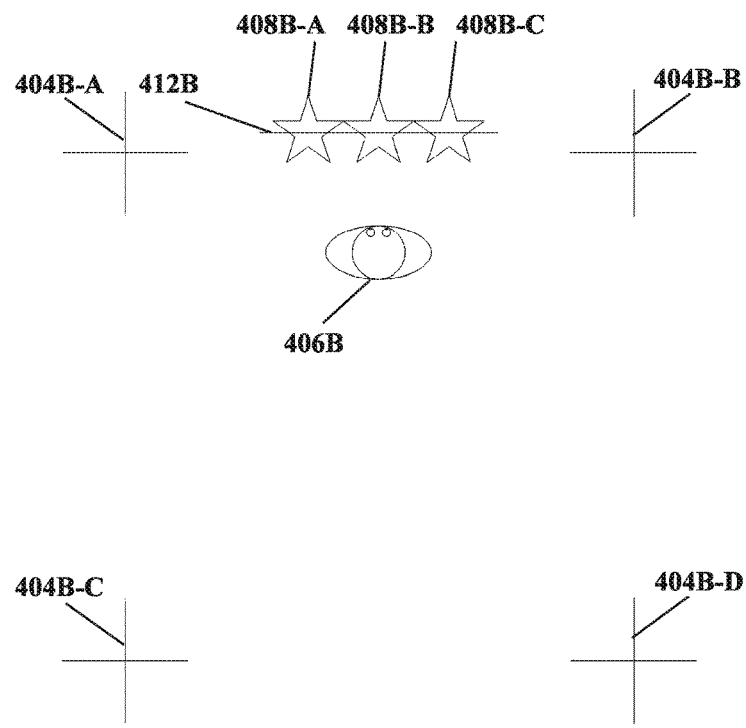
FIG. 4B shows an example embodiment of a display space mode of an interface according to the present embodiment, following a translation of the viewer therein.

Turning now to FIG. 4B, an arrangement similar to that in FIG. 4A is shown, but with the viewer 406B having translated forward as may be seen with respect to the registration marks 404B-A through 404B-D. Again, however, although the viewer 406B has translated with respect to the registration marks 404B-A through 404B-D, the viewer 406B has not translated with respect to display space 412B or with respect to the entities 408B-A through 308B-C disposed within display space 412B. Rather, translation by the viewer 406B thus corresponds with substantially zero translation with respect to display space 412B.

Figure 4C:
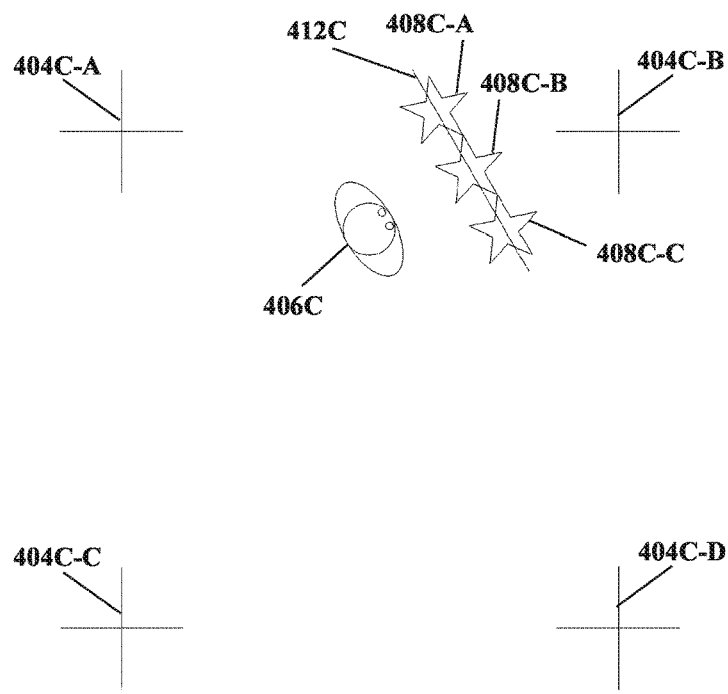
FIG. 4C shows an example embodiment of a display space mode of an interface according to the present embodiment, following a rotation of the viewer therein.

Moving on, FIG. 4C shows an arrangement similar to that in FIG. 4B, but with the viewer 406C having rotated clockwise approximately 60 degrees as may be seen with respect to the registration marks 404C-A through 404C-D. However, although the viewer 406C has rotated with respect to the registration marks 404C-A through 404C-D, the viewer 406C has not rotated with respect to display space 412C or with respect to the entities 408C-A through 408C-C disposed within display space 412C. Rather, rotation by the viewer 306C thus corresponds with substantially zero rotation with respect to display space 312C.

It is emphasized, as may be seen by comparison of FIG. 3A through FIG. 3C against FIG. 4A through FIG. 4C, that the configuration, form, etc. of display space does not necessarily affect the behavior and/or function of display space. Likewise, the configuration, form, etc. of sphere space and/or world space also does not necessarily affect the behavior and/or function of sphere space and/or world space.

Figure 5A:
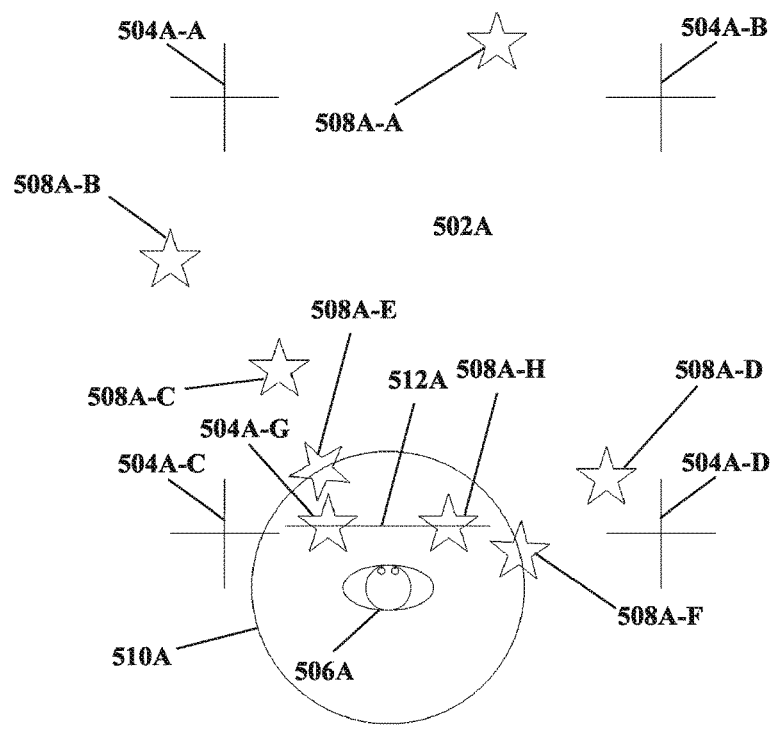
FIG. 5A shows another example embodiment of a combined world space, sphere space, and display space according to the present embodiment, with a viewer therein.
Figure 5B:
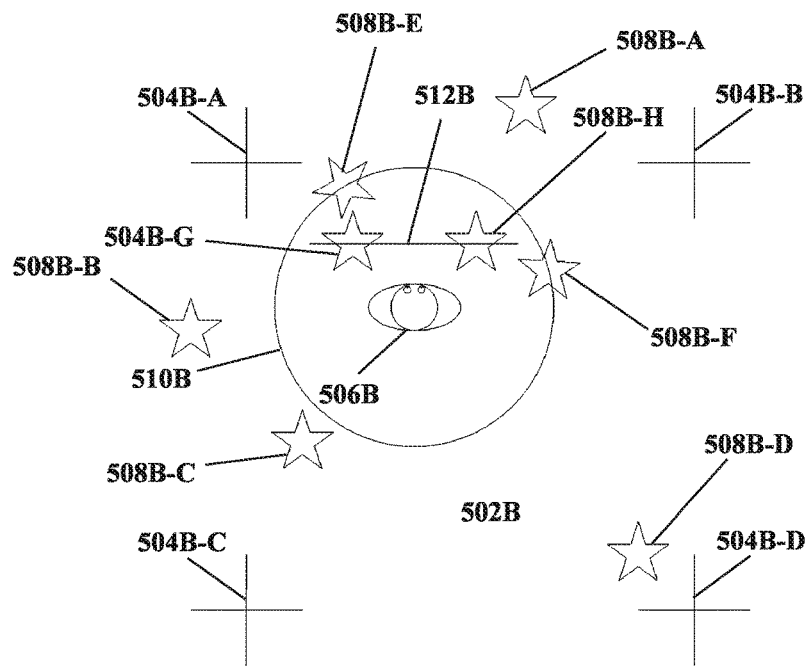
FIG. 5B shows an example embodiment of a combined world, sphere, and display spaces according to the present embodiment, following a translation of the viewer therein.
Figure 5C:
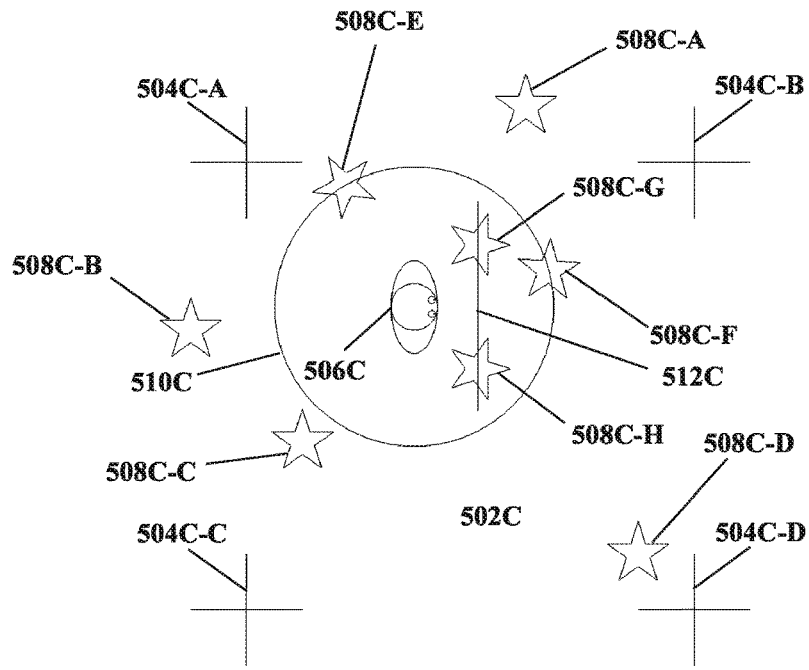
FIG. 5C shows an example embodiment of a combined world space, sphere space, and display space according to the present embodiment, following a rotation of the viewer therein.

Moving on, where FIG. 1A through FIG. 1O showed world space individually, FIG. 2A through FIG. 2C showed sphere space individually, and FIG. 3A through FIG. 3C and FIG. 4A through FIG. 4C showed display space individually, FIG. 5A through FIG. 5C show an arrangement with a world space mode, a sphere space mode, and a display space mode together.

With reference now to FIG. 5A, a viewer 506A is shown therein. Reference marks 504A-A, 504A-A, 504A-A, and 504A-A are shown so as to make certain translations, rotations, etc. more readily apparent.

Also shown in FIG. 5A is a world space 502A (illustrated as being unbounded, similarly to FIG. 1A through FIG. 1O), a sphere space 510A (illustrated as a circle substantially centered on the viewer 506A, similarly to FIG. 2A through FIG. 2C), and a display space 512A (illustrated as a finite plane disposed in front of the viewer 506A, similarly to FIG. 4A through FIG. 4C).

A number of example entities are also shown in FIG. 5A, each being disposed in one of world space 502A, sphere space 510A, and display space 512A. More particularly, entities 508A-B, 508A-B, 508A-C, and 508A-D are shown disposed in world space 502A, entities 508A-E and 508A-F are shown disposed in sphere space 510A, and entities 508A-G and 508A-H are shown disposed in display space 512A.

No distinction is illustrated between the entities 508A-A through 508A-H based on whether they are disposed within world space 502A, sphere space 510A, or display space 512A. This is deliberate and illustrates that a particular entity is not necessarily limited to any of world space 502A, sphere space 510A, and display space 512A, nor are any of world space 502A, sphere space 510A, and display space 512A limited insofar as to what entities may be disposed therein.

In addition, entities are not necessarily prohibited from moving, being copied, or otherwise transitioning among world space 502A, sphere space 510A, and display space 512A; for at least some embodiments, moving entities from (for example) sphere space 510A to display space 512A, etc. may be enabled.

Furthermore, the presence of world space 502A, sphere space 510A, and display space 512A should not be taken to imply that the presence of other spaces is necessarily excluded or restricted. While certain embodiments may utilize only world space 502A, sphere space 510A, and display space 512A, other embodiments may utilize additional spaces, including but not limited to a file storage space, a hidden "hammerspace", etc. Likewise, for at least certain embodiments entities may be enabled to be moved, copied, etc. among world space 502A, sphere space 510A, and display space 512A and any other space(s) that may be present.

Moving on to FIG. 5B, an arrangement similar to that in FIG. 5A is shown, but with the viewer 506B having translated forward some distance as may be seen with respect to the registration marks 504B-A through 504B-D.

A comparison of FIG. 5B with FIG. 5A reveals several features regarding the relationships between the viewer 506B and world space 502B, sphere space 510B, and display space 512B, and between the viewer 506B and the entities 508B-A through 508B-H disposed in world space 502B, sphere space 510B, and display space 512B. Translation of the viewer 506B substantially corresponds with translation with respect to world space 502B, and with respect to the entities 508B-A through 508B-D disposed therein. However, translation by the viewer 506B corresponds with substantially zero translation with respect to sphere space 510B and with respect to the entities 508B-E and 508B-F disposed therein. Translation by the viewer 506B also corresponds with substantially zero translation with respect to display space 512B and with respect to the entities 508B-G and 508B-H disposed therein.

Continuing with FIG. 5C, therein is shown an arrangement similar to that in FIG. 5B, but with the viewer 506C having rotated clockwise approximately 90 degrees as may be seen with respect to the registration marks 504C-A through 504C-D.

Again, a comparison of FIG. 5C with FIG. 5B reveals several features regarding the relationships between the viewer 506C and world space 502C, sphere space 510C, and display space 512C, and between the viewer 506C and the entities 508C-A through 508C-H disposed in world space 502C, sphere space 510C, and display space 512C. Rotation of the viewer 506C substantially corresponds with rotation with respect to world space 502C, and with respect to the entities 508C-A through 508C-D disposed therein. Similarly, rotation of the viewer 506C substantially corresponds with rotation with respect to sphere space 510C, and with respect to the entities 508C-E and 508C-F disposed therein. However, rotation by the viewer 506C corresponds with substantially zero rotation with respect to display space 512C and with respect to the entities 508C-G and 508C-H disposed therein.

Thus, the behavior of world space, sphere space, and display space together is similar to the behavior of world space, sphere space, and display space individually as previously described herein. That is, for world space translation by a viewer substantially corresponds with translation with respect to world space, and rotation by the viewer substantially corresponds with rotation with respect to world space. For sphere space, translation by a viewer corresponds with substantially zero translation with respect to sphere space, and rotation by the viewer substantially corresponds with rotation with respect to the sphere space. For display space, translation by a viewer corresponds with substantially zero translation with respect to display space, and rotation by the viewer corresponds with substantially zero rotation with respect to the display space.

It may at this point be illuminating to point out certain advantages of the present embodiment, relating at least in part to the combination of world space, sphere space, and display space therein. The advantages and/or functions as presented are examples only, and the present embodiment is not limited to those specifically described herein.

For example, as noted elsewhere herein entities may be transferred, copied, etc. among world space, sphere space, and display space. That is, an entity in world space could be either moved to world space, or a copy thereof made and left in world space with the original remaining in display space (potentially with a data link of some sort between the original and the copy, e.g. a link that updates the copy in one space if the original in another space is modified). As a more concrete example, a user might create and/or edit an entity in display space or sphere space, spaces that (as described herein) tend to remain at a consistent distance from the user, and which in the case of display space also tends to remain at a consistent orientation relative to the user, features which may prove convenient for the creation and/or editing of entities such as documents, images, etc. After creating and/or editing the entity, the user might then move the entity to world space, for example, to become part of a virtual "world".

Conversely, a user might copy an entity from world space into sphere space or display space. As another more concrete example, a user might decide to create a label, leave a comment, establish a link, etc. for a world space entity. The user could, for convenience, move or copy the entity into display space or sphere space for creating the label, comment, etc. Once finished, the user could transfer or copy the entity (with the label, comment, etc. added) back to world space.

In addition, for certain embodiments one or more spaces may be shared spaces, that is, accessible, viewable, and/or editable by multiple users. Conversely, one or more spaces may be personal or non-shared spaces, that is, accessible, viewable, and/or editable only by a single user. For example, in some embodiments world space might be shared, i.e. as a wider virtual and/or augmented world, while sphere space and/or display space in those embodiments are personal for each user. The use of multiple spaces as described herein enables the ability to readily transfer entities between public, multi-user functionality and private, single-user functionality, and also to readily distinguish between public and private functionality.

Again as a more concrete example, the combination of world space, sphere space, and display space of the present embodiment could support collaborative work between multiple users (potentially at a considerable distance within the physical world). Individuals could create and modify content within their personal sphere spaces and display spaces while contributing shared content within a shared world space.

It is noted that such shared spaces are not limited only to world space. For example, a single shared sphere space might be disposed surrounding multiple users and/or avatars. Moreover, different spaces may be shared to different degrees, for example, world space being accessible to all users in a particular system, sphere space being accessible to a group of users but not necessarily all users and display space being accessible only to a single user. Furthermore, the present embodiment is not necessarily limited only to a single world space, sphere space, and/or display space. A group of users might establish and share a sphere space surrounding those users (or avatars), for example, while each individual user also has a personal sphere space surrounding him or her. Multiple display spaces and/or multiple world spaces likewise may be suitable for certain embodiments of the present embodiment.

In addition, with a distinct world space, sphere space, and display space established, that very distinction enables potentially useful interactions. As a simple example, a user might have or might create, one or more cursors or similar marking point within display space. By aligning that cursor—and thus aligning display space—with some entity within sphere space or world space, the user might indicate their selection of the entity within sphere space or world space. Since, as described herein, display space is substantially stationary with regard to the position and orientation of the viewer—that is, from the viewer's point of view display space typically does not rotate or translate—a user can align display space by changing their facing, moving, etc. Through such an approach, a user could select entities in sphere space and/or world space without necessarily touching those entities, or executing similar manipulation. The combination of display space with sphere space and world space thus enables what might be considered "hands-free" manipulation of a virtual and/or augmented reality environment.

Furthermore, with distinct world space, sphere space, and display space, it is enabled to establish "markers" within one space that are linked to another space. For example, consider a marker representing the location of a restaurant in the world space of an augmented reality environment. While the restaurant marker may be in world space, a secondary marker could be established in display space and/or world space, for example as a pointer to the location of the marker in world space. While a user typically moves through world space, and thus may be some considerable distance from a marker therein (potentially also with obstructions to the user's line of sight to the world space marker), sphere space and display space typically translate with the user, and thus are in effect always (or nearly always) nearby. Put differently, a user might not be able to see or interact with a world space marker that is many miles away, but might more readily see, interact with, and/or even touch a sphere space or display space marker since sphere space and display space move with the user.

As noted, these are examples only, and other functions and advantages of the present embodiment may exist besides those specifically described herein.

Figure 6:
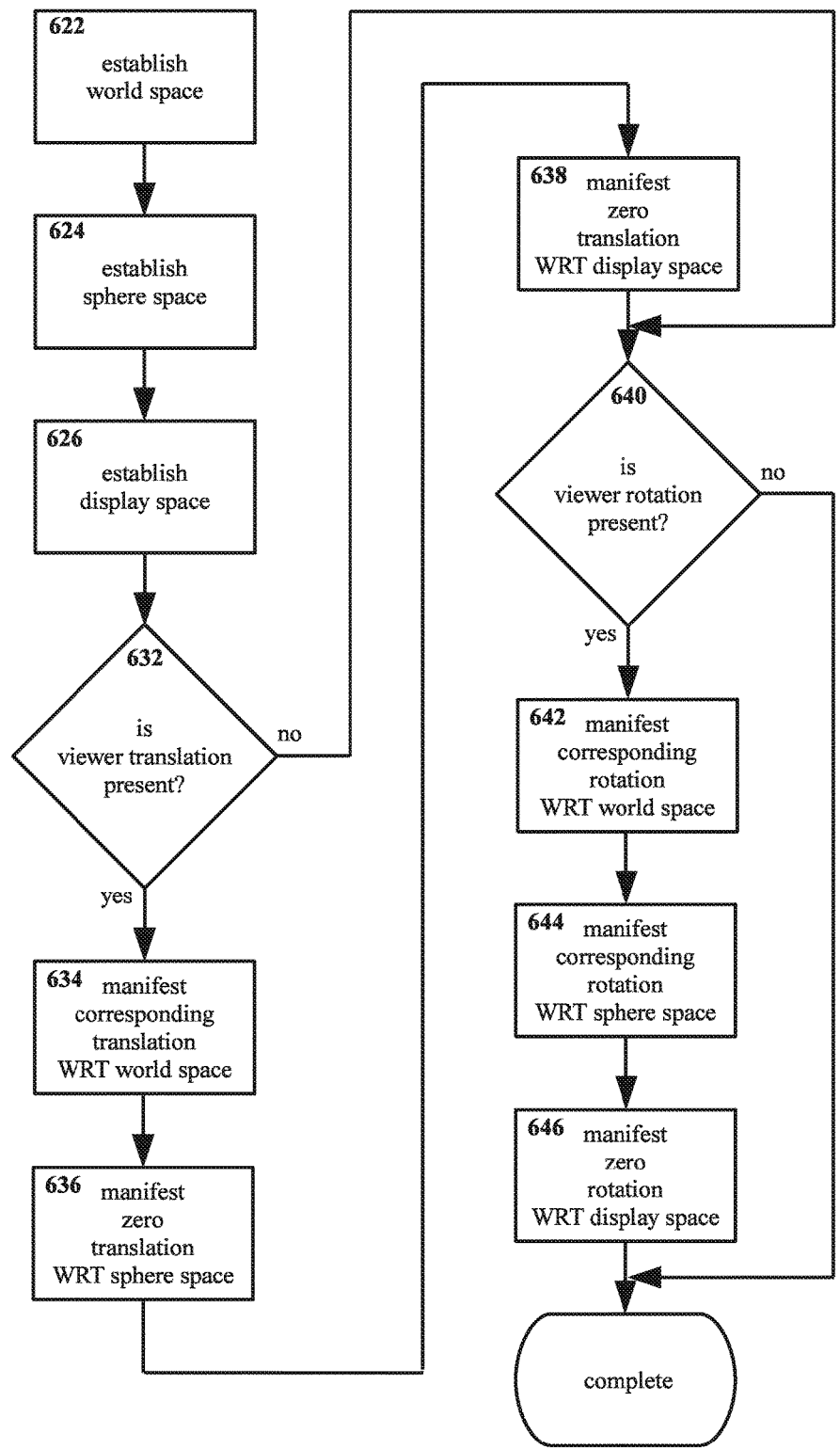
FIG. 6 shows an example embodiment of a method for interacting with an interface using world space, sphere space, and display space according to the present embodiment.

Moving on to FIG. 6, therein is shown a method for interfacing with a system according to the present embodiment. In the method, a world space is established 622. The nature and behavior of world space have been described previously herein. Briefly, translation by a viewer substantially corresponds with translation with respect to world space, and rotation by the viewer substantially corresponds with rotation with respect to world space.

A sphere space also is established 624. The nature and behavior of sphere space have also been described previously herein. Briefly, translation by a viewer corresponds with substantially zero translation with respect to sphere space, and rotation by the viewer substantially corresponds with rotation with respect to the sphere space.

A display space is established 626. Again, the nature and behavior of display space have been described previously herein. Briefly, translation by a viewer corresponds with substantially zero translation with respect to display space, and rotation by the viewer corresponds with substantially zero rotation with respect to the display space.

The term "establishing", such as with regard to world space, sphere space, and display space, should be considered broadly. In establishing world space, for example, world space may be loaded into a processor from stored executable instructions, may be defined as a rule set, may be partitioned from another space (whether a real-world space, a virtual reality space, an augmented reality space, or otherwise), etc. It is noted that such options—loading, defining, partitioning, etc.—are not necessarily exclusive, and a single embodiment may utilize more than one. So long as the end result is a world space as described herein, the manner by which the world space is established is not particularly limited. Similarly, the present embodiment is not particularly limited with regard to the manner or manners by which sphere space and/or display space are established.

For at least certain embodiments, establishing a world space, sphere space, and/or display space may include, but is not required to include, outputting the world space, sphere space, and/or display space. Likewise, establishing a world space, sphere space, and/or display space may include, but is not required to include, outputting entities (e.g. icons, controls, images, text, graphics, video feed, audio feed, etc.) within the world space, sphere space, and/or display space. For example, world space, sphere space, and/or display space, and/or content disposed therein, may be visually outputted to the viewer through a head-mounted display or another device. However, world space, sphere space, and/or display space in and of themselves may or may not have any visibility (i.e. may be constructs of rules, data, etc. without directly visible content); likewise although entities may be present and/or may be visible if present within world space, sphere space, and/or display space, it is not required that such entities be present or be visible if present.

Thus, while at least certain embodiments of the present embodiment may include outputting visual content (and/or other sensory) for and/or associated with a world space, sphere space, and/or display space, such outputting of visual content is not required for the present embodiment.

A determination is made 632 as to whether a viewer translation is present. If a viewer translation is not present, the method proceeds with step 640 below. If a viewer translation is present, the method proceeds with step 634, namely, a substantially corresponding translation with respect to world space is manifested. Substantially zero translation with respect to sphere space is manifested 636, and substantially zero translation with respect to display space also is manifested 638.

The present embodiment is not particularly limited with regard to how viewer translation may be determined. For at least some embodiments, it may be useful to utilize sensors in communication with a processor carrying out the method according to the present embodiment. Suitable sensors may include, but are not limited to, imagers (singly, in groups, in stereo configurations, etc.), structured light sensors, time-of-flight sensors, ultrasonic sensors, accelerometers, gyroscopes, GPS sensors, a magnetometers, and/or wireless signal triangulation sensors (including but not limited to wifi positioning sensors). Also, it is noted that sensors may for at least some embodiments be disposed on one or more viewers, e.g. in a portable device such as a head-mounted display. However, these are examples only, and other arrangements may be equally suitable.

In addition, it may be suitable for at least some embodiments to determine translation indirectly. That is, rather than determining the translation of the viewer per se, the translation and/or other motion of some sensor, marker, article of clothing, specific body part, etc. may be utilized, with the translation of the viewer being inferred or determined therefrom. Moreover, for an embodiment wherein one or more sensors are disposed on the viewer (e.g. in a portable or wearable device), translation might be determined without sensing the viewer at all, but rather might rely upon sensing a surrounding environment and inferring a translation therefrom.

In such an arrangement, the sensors would not necessarily determine the translation of the viewer by sensing the viewer, but might instead sense changes.

Depending on the particulars of an embodiment, manifesting a zero or substantially zero change in translation (and likewise rotation, below) may be passive in nature. That is, manifesting zero translation may amount to taking no or substantially no action, i.e. not actively determining and/or applying a translation or other change. However, it is noted that even a zero translation with respect to, for example, sphere space, may nevertheless for other embodiments include active changes. It is pointed out, for example with regard to FIG. 2B, that the position of sphere space 210B as shown in FIG. 2B and the entities 208B-A and 208B-B disposed therein translates or at least may translate with respect to external coordinates (as may be noted by the change in position between sphere space 210B and the registrations marks 204B-A through 204B-D as compared with FIG. 2A). Thus even if a viewer experiences no translation with respect to sphere space, sphere space itself may nevertheless translate with respect to some other frame of reference, and thus some active change to sphere space may occur even if such change is not immediately apparent to the viewer.

Continuing in FIG. 6, a determination is made 640 as to whether a viewer rotation is present. If a viewer rotation is not present, the method is complete. If a viewer rotation is present, the method proceeds with step 642, namely, a substantially corresponding rotation with respect to world space is manifested. A substantially corresponding rotation with respect to sphere space also is manifested 644. In addition, substantially zero translation with respect to display space is manifested 646.

As stated previously with regard to translation, the present embodiment also is not particularly limited with regard to how viewer rotation may be determined. For at least some embodiments, it may be useful to utilize sensors in communication with a processor carrying out the method according to the present embodiment. Suitable sensors may include, but are not limited to, imagers (singly, in groups, in stereo configurations, etc.), structured light sensors, time-of-flight sensors, ultrasonic sensors, accelerometers, gyroscopes, GPS sensors, a magnetometers, and/or wireless signal triangulation sensors (including but not limited to wife positioning sensors). Also, it is noted that sensors may for at least some embodiments be disposed on one or more viewers, e.g. in a portable device such as a head-mounted display. However, these are examples only, and other arrangements may be equally suitable.

In addition, it may be suitable for at least some embodiments to determine rotation indirectly. That is, rather than determining the rotation of the viewer per se, the rotation and/or other motion of some sensor, marker, article of clothing, specific body part, etc. may be utilized, with the rotation of the viewer being inferred or determined therefrom. Moreover, for an embodiment wherein one or more sensors are disposed on the viewer (e.g. in a portable or wearable device), the rotation might be determined without sensing the viewer at all, but rather might rely upon sensing a surrounding environment and inferring a rotation therefrom.

Although FIG. 6 shows the method therein as being complete following step 646, it is emphasized that the method in FIG. 6 is an example only. Other steps, other functions, etc. may be incorporated into the method, and/or other methods may be executed in combination with the method according to the present embodiment. In addition, for at least certain embodiments the method may repeat, e.g. in an ongoing loop that continues to sense for viewer translations and/or rotations and that manifests appropriate changes (and/or lack of same) in response thereto. Such an arrangement may, for example, provide what might be described as an ongoing, dynamic update of position and orientation of a viewer with respect to world space, sphere space, and/or display space.

Figure 7A:
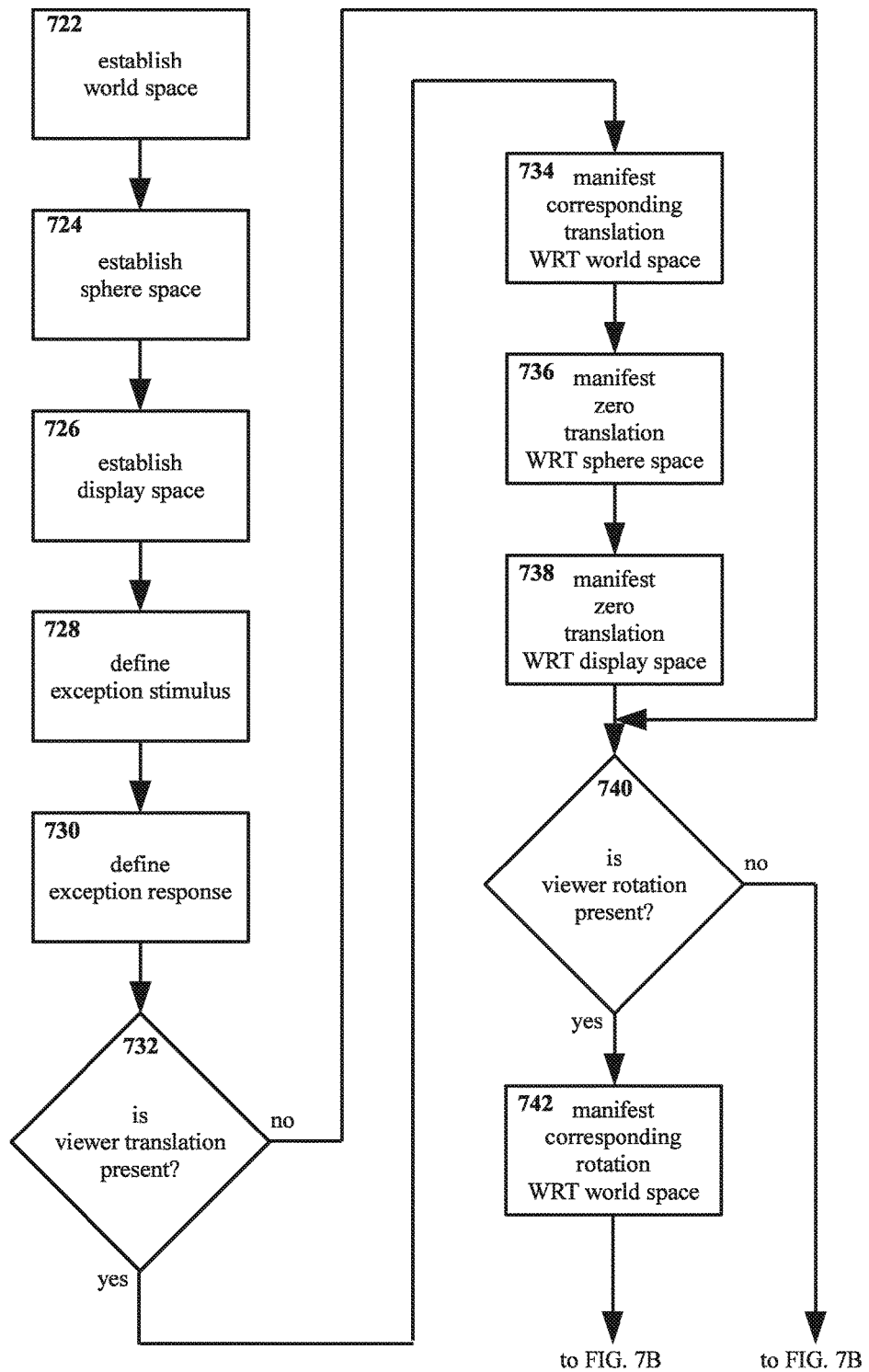
FIG. 7A shows another example embodiment of a method for interacting with an interface using world space, sphere space, and display space according to the present embodiment, also enabling exceptions to default interaction behavior thereof.

Turning now to FIG. 7A, as has been previously described (for example with regard to FIG. 3D through FIG. 3F) the present embodiment may incorporate therein exceptions to the default behaviors associated with world space, sphere space, and/or display space. Exceptions may include but are not limited to rotation of sphere space with respect to a viewer, rotation and/or translation of display space with respect to the viewer, and resizing of one or more of world space, sphere space, and display space. FIG. 7A shows an example method that enables such an exception.

In the method shown in FIG. 7A, a world space is established 722. A sphere space also is established 724, and a display space further is established 726.

In addition, an exception stimulus is established 728. As noted previously with regard to FIG. 3D through FIG. 3F, exceptions to the default behavior of world space, sphere space, and/or display space a stimulus may be invoked through such an exception stimulus. Typically, though not necessarily, such an exception stimulus is or includes some action on the part of the viewer, including but not limited to a voice command, a hand posture or gesture, a stylus posture or gesture, an eye posture or gesture, or a modulation of a viewer's brainwave pattern. In establishing an exception stimulus 728, the particulars of an exception stimulus are determined. For example, if an exception stimulus is to be used to invoke an exception, the exception stimulus may be a hand gesture and may be more particularly a specific hand gesture such as a thumb-and-finger pinch, a two-finger click, a grab-and-twist, etc.

The present embodiment is not particularly limited insofar as what stimuli may be utilized as exception stimuli. Furthermore, the present embodiment is not particularly limited with regard to how exception stimuli may be established, or the form of exception stimuli. A hand posture might specify the position of particular fingertips or other end-effectors, or might specify a hand outline or profile shape, may or may not utilize edge detection or color discrimination, may utilize a variety of algorithms and approaches for determining hand position, may rely on different instruments (if any) for sensing hand position, etc. Typically, though not necessarily, an exception stimulus may be established 728 as mathematical or computational parameters, executable instructions, etc. adapted to be utilized by a data processor. However, other arrangements may be equally suitable.

For embodiments having multiple exception stimuli, exception stimuli may be defined and/or described individually, for example with reference to the change associated with the exception. Thus, exception stimuli might include, but are not limited to, a world rotation stimulus, a world translation stimulus, a world resizing stimulus, a sphere rotation stimulus, a sphere translation stimulus, a sphere resizing stimulus, a display rotation stimulus, a display translation stimulus, and a display resizing stimulus. Other stimuli than translation, rotation, and resizing, and/or other effects than translation, rotation, and resizing, may be equally suitable, and the present embodiment is not limited only thereto.

Moving on in FIG. 7A, an exception response is established 730.

In establishing an exception response 730, the particulars of an exception response are determined. That is, does the exception response in question include a translation of one or more of world space, sphere space, and display space, a rotation thereof, a resizing thereof, etc.

The present embodiment is not particularly limited insofar as what actions may be utilized as exception responses. Furthermore, the present embodiment is not particularly limited with regard to how exception responses may be established, or the form of exception responses. Typically, though not necessarily, an exception response may be established 730 as mathematical or computational parameters, executable instructions, etc. adapted to be utilized by a data processor, e.g. to enable the processor to execute a translation, rotation, resizing, etc. However, other arrangements may be equally suitable.

As with exception stimuli, for embodiments having multiple exception responses the exception responses may be defined and/or described individually, for example with reference to the change associated with the exception. Thus exception responses might include, but are not limited to, a world rotation response, a world translation response, a world resizing response, a sphere rotation response, a sphere translation response, a sphere resizing response, a display rotation response, a display translation response, and a display resizing response.

Continuing in FIG. 7A, determination is made 732 as to whether a viewer translation is present. If a viewer translation is not present, the method proceeds with step 740 below. If a viewer translation is present, the method proceeds with step 734, namely, a substantially corresponding translation with respect to world space is manifested. Substantially zero translation with respect to sphere space is manifested 736, and substantially zero translation with respect to display space also is manifested 738.

Moving on in FIG. 7A, a determination is made 740 as to whether a viewer rotation is present. If a viewer rotation is not present, the method is complete. If a viewer rotation is present, the method proceeds with step 742, namely, a substantially corresponding rotation with respect to world space is manifested. Continuing then in FIG. 7B, a substantially corresponding rotation with respect to sphere space also is manifested 744. In addition, substantially zero translation with respect to display space is manifested 746.

A determination is made 748 as to whether the exception stimulus is present (the exception stimulus being established 728 as shown in FIG. 7A). If the exception stimulus is not present, the method proceeds with step 750 below. If the exception stimulus is present, the method proceeds with step 748, namely, the exception response is executed (the exception response being established 730 as shown in FIG. 7A).

Figure 7B:
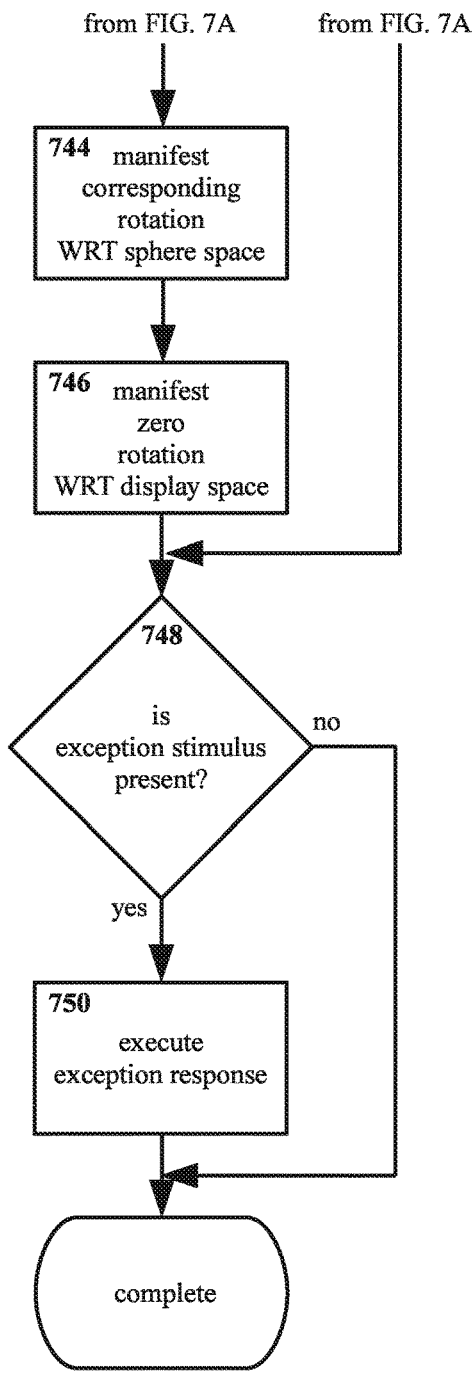
FIG. 7B shows another example embodiment of a method for interacting with an interface using world space, sphere space, and display space according to the present embodiment, also enabling exceptions to default interaction behavior thereof.

Although FIG. 7B shows the method therein as being complete following step 750, it is emphasized that the method in FIG. 7A and FIG. 7B is an example only. Other steps, other functions, etc. may be incorporated into the method, and/or other methods may be executed in combination with the method according to the present embodiment. For example, although FIG. 7A and FIG. 7B show only a single exception stimulus and a single exception response, multiple exception stimuli and/or multiple exception responses may be incorporated into at least some embodiments. In addition, for at least certain embodiments the method may repeat, e.g. in an ongoing loop that continues to sense for viewer translations and/or rotations and that manifests appropriate changes (and/or lack of same) in response thereto.

Figure 8:
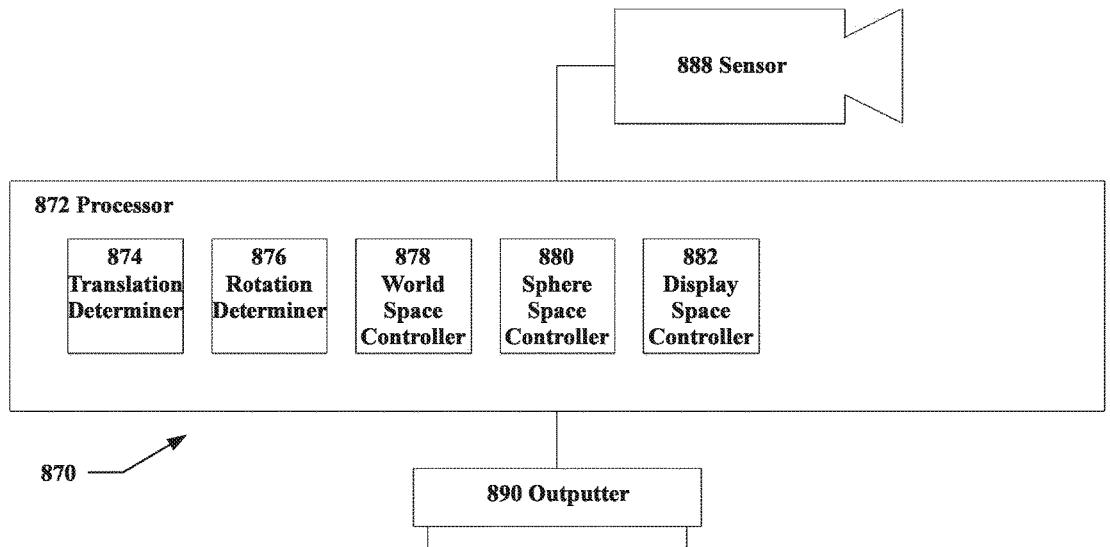
FIG. 8 shows an example embodiment of an apparatus for interacting with an interface using world space, sphere space, and display space according to the present embodiment in schematic form.

Turning now to FIG. 8, a schematic diagram of an embodiment of an apparatus 870 for interfacing with a system according to the present embodiment is shown therein.

The apparatus includes a processor 872 adapted for executing executable instructions. The embodiment is not particularly limited with regard to the choice of processor 872. Suitable data processors 872 include but are not limited to digital electronic microprocessors. Although the processor 872 is referred to in at least some places herein as a self-contained physical device for purposes of clarity, this is not required, and other arrangements may be suitable. For example, the processor 872 may constitute two or more physical processors working cooperatively, a processing capability in a network without a well-defined physical form, etc.

The apparatus includes several elements shown to be instantiated on the processor 872. The aforementioned elements include a translation determiner 874, a rotation determiner 876, a world space controller 878, a sphere space controller 880, and a display space controller 882. As shown in FIG. 8 the translation determiner 874, rotation determiner 876, world space controller 878, sphere space controller 880, and display space controller 882 are disposed on the processor 872. Typically the translation determiner 874, rotation determiner 876, world space controller 878, sphere space controller 880, and display space controller 882 include executable instructions and/or data, e.g. instantiated on the processor 872, and in at least some embodiments the translation determiner 874, rotation determiner 876, world space controller 878, sphere space controller 880, and display space controller 882 may be exclusively executable instructions and/or data. However, this is an example only.

For at least some embodiments any or all of the translation determiner 874, rotation determiner 876, world space controller 878, sphere space controller 880, and display space controller 882 may include components other than executable instructions and/or data. For example, any or all of the translation determiner 874, rotation determiner 876, world space controller 878, sphere space controller 880, and display space controller 882 may include some physical device such as an embedded processor, a datan input, a sensor, etc. However, for certain embodiments even when such hardware is present, it may be suitable to consider such hardware as being distinct from the translation determiner 874, rotation determiner 876, world space controller 878, sphere space controller 880, and/or display space controller 882. That is, while hardware (or other components) may be present in addition to executable instructions and/or data for at least some embodiments, the presence of hardware does not necessarily imply that such hardware is or should be considered to be part of the translation determiner 874, rotation determiner 876, world space controller 878, sphere space controller 880, and/or display space controller 882.

Furthermore, for at least some embodiments any or all of the translation determiner 874, rotation determiner 876, world space controller 878, sphere space controller 880, and display space controller 882 may exclude executable instructions and/or data. For example, any or all such might utilize hardware such as dedicated circuits adapted to perform the functions disclosed therefor (below) without necessary incorporating and/or relying on executable instructions or data instantiated on a processor.

Thus, depending on the particulars of a given embodiment, the translation determiner 874, rotation determiner 876, world space controller 878, sphere space controller 880, and display space controller 882 may be executable instructions and/or data only, executable instructions and/or data plus other components, or components excluding executable instructions and/or data.

However, for purposes of clarity for the example embodiment shown in FIG. 8, the translation determiner 874, rotation determiner 876, world space controller 878, sphere space controller 880, and display space controller 882 will be referred to in at least some places herein as being executable instructions and/or data instantiated on the processor 872.

It is noted further that although the translation determiner 874, rotation determiner 876, world space controller 878, sphere space controller 880, and display space controller 882 are shown and described herein as being separate elements, this is done for clarity and should not be taken to limit the present embodiment. For at least some embodiments, one or more of the translation determiner 874, rotation determiner 876, world space controller 878, sphere space controller 880, and display space controller 882 may be combined with one another, and/or may be incorporated into some larger construct, e.g. a single program performing all functions thereof, a general operating system, etc.

Again with reference to FIG. 8, the translation determiner 874 is adapted to determine a translation of a person such as a viewer and/or user of an augmented reality environment, virtual reality environment, etc. As noted above, typically although not necessarily the translation determiner 874 includes executable instructions and/or data instantiated on a processor 872.

Typically but not necessarily, the translation determiner 874 is adapted to determine both a direction and a distance of viewer translation. Other features of translation may be determined, including but not limited to instantaneous speed, average speed over some time, instantaneous acceleration, average acceleration over some time, minimum and/or maximum speed, minimum and/or maximum acceleration, and distance, speed, and/or acceleration in individual components or coordinates (e.g. x, y, and z).

Typically although not necessarily, translation may be determined by the translation determiner 874 in three dimensions, although for at least certain embodiments determining translation in two dimensions or even in one dimension may be sufficient.

As previously noted with regard to FIG. 6, the manner by which translation is determined is not particularly limited.

Still with regard to FIG. 8, the rotation determiner 876 is adapted to determine a rotation of a person such as a viewer and/or user of an augmented reality environment, virtual reality environment, etc. As noted above, typically although not necessarily the rotation determiner 876 includes executable instructions and/or data instantiated on a processor 872.

Typically but not necessarily, the rotation determiner 876 is adapted to determine both a direction and a degree of viewer rotation. Other features of rotation may be determined, including but not limited to identifying an axis or axes thereof, instantaneous speed, average speed over some time, instantaneous acceleration, average acceleration over some time, minimum and/or maximum speed, minimum and/or maximum acceleration, and distance, speed, and/or acceleration in individual components or coordinates.

Typically although not necessarily, rotation may be determined by the translation determiner 874 with respect to three axes, although for at least certain embodiments determining translation with respect to two axes or even one axis may be sufficient.

As previously noted with regard to FIG. 6, the manner by which rotation is determined is not particularly limited.

The world space controller 878 is adapted to determine a translation of the viewer with respect to world space that substantially corresponds with the translation of the viewer as determined by the translation determiner 874. The world space controller 878 also is adapted to determine a rotation of the viewer with respect to world space that substantially corresponds with the rotation of the viewer as determined by the rotation determiner 876. For example, for certain embodiments the world space controller 878 may determine suitable updates to world space as presented to the viewer (e.g. for a stereo visual output) such that viewer translation produces substantially corresponding translation with respect to world space, and viewer rotation produces substantially corresponding rotation with respect to world space.

The sphere space controller 880 is adapted to determine a translation of the viewer with respect to sphere space that substantially corresponds with the translation of the viewer as determined by the translation determiner 874. The sphere space controller 880 also is adapted to determine a substantially zero rotation of the viewer with respect to sphere space regardless of the rotation of the viewer as determined by the rotation determiner 876. For example, for certain embodiments the sphere space controller 880 may determine suitable updates to sphere space as presented to the viewer (e.g. for a stereo visual output) such that viewer translation produces substantially corresponding translation with respect to sphere space, and viewer rotation produces substantially zero rotation with respect to sphere space.

The display space controller 882 is adapted to determine a substantially zero translation of the viewer with respect to display space regardless of the translation of the viewer as determined by the translation determiner 874. The display space controller 882 also is adapted to determine a substantially zero rotation of the viewer with respect to display space regardless of the rotation of the viewer as determined by the rotation determiner 876. For example, for certain embodiments the display space controller 882 may determine suitable updates to display space as presented to the viewer (e.g. for a stereo visual output) such that viewer translation produces substantially zero translation with respect to display space, and viewer rotation produces substantially zero rotation with respect to display space.

It will be understood that determining a substantially zero translation and/or a substantially zero rotation does not necessarily equate to making zero change. For example, although a viewer that rotates may experience no change in the apparent position of display space, display space may in fact be rotating with the viewer so that the apparent lack of rotational change is maintained. Thus, determining substantially zero translation and/or substantially zero rotation do not necessarily constitute a simple lack of action, but rather may include computation, data manipulation, image processing, etc. so as to maintain what appears to the viewer to be zero translation and/or zero rotation of certain content (e.g. content in sphere space, display space, etc.) even when the viewer may in fact be translating and/or rotating.

Still with reference to FIG. 8, the apparatus 870 includes a sensor 888 in communication with the processor 872, and thus notably in communication with the translation determiner 874 and rotation determiner 876 instantiate on the processor 872. The sensor is adapted to sense translation and/or rotation of a person such as a viewer. As previously noted, the translation determiner 874 and rotation determiner 876 are adapted to determine, e.g. to measure direction and/or magnitude of, translations and/or rotations. The sensor 888 is adapted to supply data so as to facilitate determination of translation and/or rotation by the translation determiner 874 and/or the rotation determiner 876.

As previously stated with regard to FIG. 6, the present embodiment is not particularly limited with regard to how translation and/or rotation may be determined. Likewise, the present embodiment is not particularly limited with regard to how data for such determinations may be obtained, or what sensor(s) may be utilized for acquiring data for such determinations.

In particular, although the sensor 888 is shown in FIG. 8 as being in direct communication with the processor 872, this is an example only. For at least certain embodiments, the sensor 888 may be a considerable distance from the processor 872, and/or may not be in direct communication with the processor 872. For example, data might be gathered by a sensor 888 and conveyed to the processor through some communication system (e.g. wifi, data lines, etc.), or might be stored in some storage unit and subsequently read therefrom by the processor 872, etc.

The apparatus 870 further includes an outputter 890 in communication with the processor 872, and thus notably in communication with the world space controller 878, sphere space controller 880, and display space controller 882. The outputter 890 is adapted to output at least certain aspects of world space, sphere space, and/or display space, and/or changes thereto. More particularly, the outputter 890 is adapted to output the substantially corresponding translation of said viewer with respect to world space; to output the substantially corresponding rotation of the viewer with respect to world space; to output the substantially corresponding translation of the viewer with respect to sphere space; to output the substantially zero rotation of the viewer with respect to sphere space; to output the substantially zero translation of the viewer with respect to display space; and to output the substantially zero rotation of the viewer with respect to display space.

The outputter 890 may, for at least certain embodiments, output the entirety of world space, sphere space, and/or display space, in addition to any changes (and/or lack of changes) thereto as described above. That is, the outputter may for example output an entire augmented reality environment and/or virtual reality environment, e.g. as a video display to a user. However, this is an example only, and other arrangements may be equally suitable.

The present embodiment is not particularly limited with regard to the type of outputter 890. Typically, although not necessarily, the outputter 890 may be a visual display. A range of devices may be suitable for use as the outputter 890, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. Furthermore, as noted the present embodiment is not limited only to the use of visual displays as an outputter 890.

Figure 9:
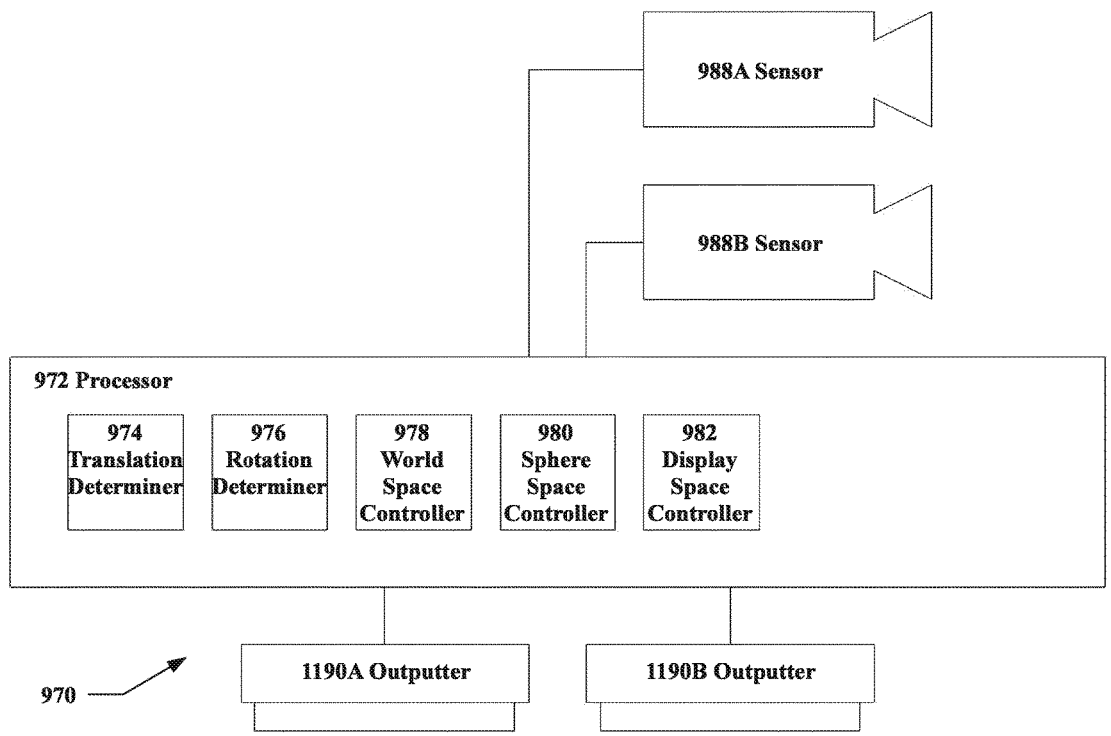
FIG. 9 shows another embodiment of an apparatus according to the present embodiment in schematic form, with dual sensors and outputters.

Now with reference to FIG. 9, a schematic diagram of another embodiment of an apparatus 970 for interfacing with a system according to the present embodiment is shown therein. The apparatus 970 includes a processor 972 adapted for executing executable instructions. The apparatus also includes a translation determiner 974, a rotation determiner 976, a world space controller 978, a sphere space controller 980, and a display space controller 982.

As previously noted, the present embodiment is not particularly limited with regard to the sensors and/or outputters. The example embodiment of FIG. 9 shows an arrangement having two sensors 988A and 988B. Such an arrangement might be useful, for example, in generating stereo information using the sensors 988A and 988B (assuming the sensors 988A and 988B are disposed in a stereo arrangement), potentially generating data for determining three dimensional translation and/or rotation information for a viewer therefrom.

Similarly, the example embodiment of FIG. 9 shows an arrangement having two outputters 990A and 990B. Such an arrangement might be useful, for example, in delivering stereo output using outputters 990A and 990B (assuming the outputters 990A and 990B are disposed in a stereo arrangement), potentially providing to the viewer and/or some other system or observer output representing three dimensional translation and/or rotation information.

Turning now to FIG. 10, a schematic diagram of another embodiment of an apparatus 1070 for interfacing with a system according to the present embodiment is shown therein. The embodiment in FIG. 10 is adapted to support exceptions to the default behavior of world space, sphere space, and/or display space as previously described herein.

The apparatus 1070 includes a processor 1072 adapted for executing executable instructions. The apparatus also includes a translation determiner 1074, a rotation determiner 1076, a world space controller 1078, a sphere space controller 1080, and a display space controller 1082. The apparatus 1070 includes a sensor 1088 in communication with the processor 1072, and an outputter 1090 in communication with the processor 1072.

The apparatus 1070 also includes an exception determiner 1084. The exception determiner 1084 is adapted to determine the presence of an exception stimulus. For example, depending upon the embodiment the exception determiner might determine the presence of a hand gesture, spoken command, etc. used to invoke an exception to the default behavior of world space, sphere space, and/or display space.

Similarly to the translation determiner, rotation determiner, world space controller, sphere space controller, and display space controller and as previously described with respect to FIG. 8, the exception determiner 1084 typically but not necessarily includes executable instructions and/or data instantiated on the processor 1072, and is not limited thereto.

The exception determiner may be referred to more specifically, for example with reference to a particular exception. Thus, an embodiment might have for example a world rotation determiner, a world translation determiner, a world resizing determiner, The apparatus 1070 further includes an exception controller 1086. The exception controller 1086 is adapted to determine an exception response as applied to world space, sphere space, display space, etc. Depending on the particular exception(s) to be implemented in a given embodiment, the exception controller 1086 may be adapted to determine suitable updates to one or more of world space, sphere space, and display space, e.g. a translation, rotation, resizing, etc. thereof, in response to the exception stimulus (as determined to be present by the exception determiner 1084). Similarly to the translation determiner, rotation determiner, world space controller, sphere space controller, and display space controller and as previously described with respect to FIG. 8, the exception determiner 1084 typically but not necessarily includes executable instructions and/or data instantiated on the processor 1072, and is not limited thereto.

For at least some embodiments, the sensor 1088 may sense data in support of determining the presence of an exception stimulus, and communicate that data to the exception determiner 1084. Likewise, for at least some embodiments the outputter may receive data associated with the exception response from the exception controller 1086, and generate output to a viewer utilizing that data.

Figure 11:
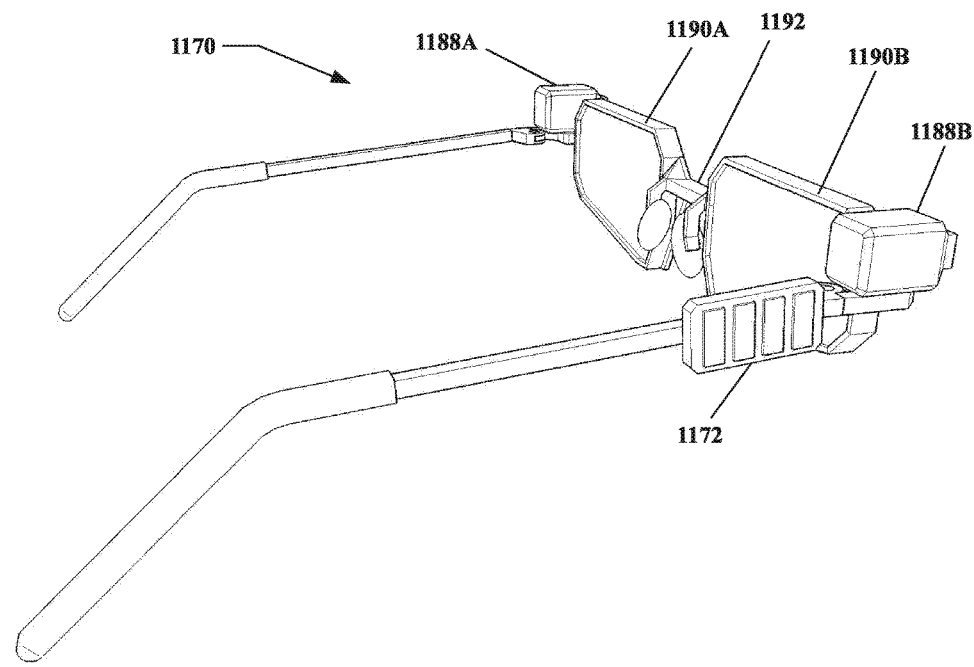
FIG. 11 shows a perspective view of an example apparatus according to the present embodiment, in the form of a head-mounted display.

Turning now to FIG. 11, the present embodiment is not particularly limited with regard to form, and may be disposed on and/or incorporated into many shapes and/or other devices. Suitable configurations include but are not limited to the example shown in FIG. 11, wherein the present embodiment is illustrated in the form of a head-mounted display resembling a pair of glasses.

As shown in FIG. 11, the example embodiment of the apparatus 1170 therein includes a body 1192 having a form similar to a pair of glasses, and adapted to be worn in a similar fashion. A processor 1172 adapted for executing executable instructions is disposed on the body 1192. Although not visible as distinct entities, the processor 1172 would support thereon of a translation determiner, a rotation determiner, a world space controller, a sphere space controller, and a display space controller, e.g. in the form of executable instructions and/or data instantiated on the processor 1172.

The apparatus 1170 also includes sensors 1188A and 1188B disposed on the body 1192, illustrated as imagers in a stereo configuration. The apparatus 1170 further includes outputters 1190A and 1190B disposed on the body 1192, illustrated as visual displays also in a stereo configuration.

It is noted that in the configuration shown, the body 1192 is configured and the sensors 1188A and 1188B are disposed thereon such that when the body 1192 is worn by a viewer, the sensors 1188A and 1188B would be substantially aligned with the lines of sight of the viewer's eyes, and could potentially encompass fields of view at least somewhat comparable to those of the viewer's eyes, assuming sensors 1188A and 1188B with fields of view similar in extent to those of the viewer.

Similarly, in the configuration shown the body 1192 is configured and the outputters 1190A and 1190B are disposed thereon such that when the body 1192 is worn by a viewer, the outputters 1190A and 1190B would be proximate to and substantially in front of the viewer's eyes.

However, it is emphasized that the arrangement in FIG. 11 is an example only, and that other arrangements may be equally suitable.

Figure 12:
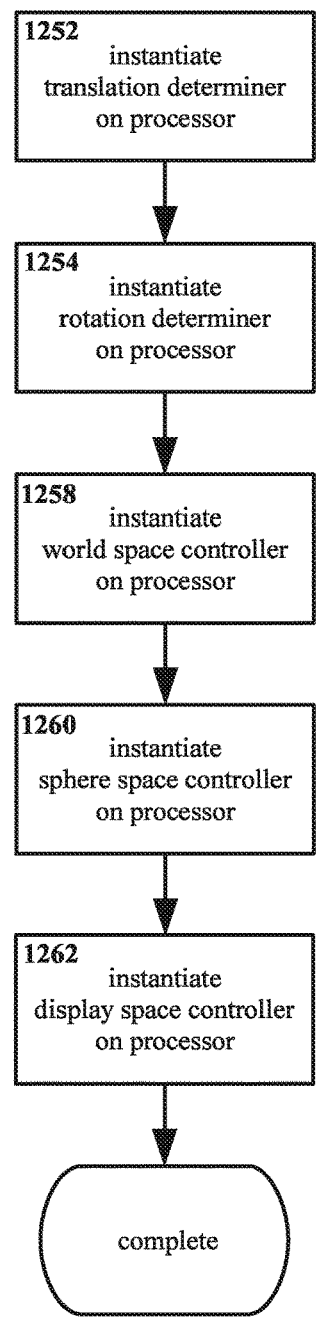
FIG. 12 shows an example embodiment of a method for establishing an interface having world space, sphere space, and display space according to the present embodiment

Referring now to FIG. 12, therein is shown a method for enabling a capability to manage interaction with a three dimensional interface in accordance with the present embodiment.

In the example method of FIG. 12, a translation determiner is instantiated on a processor 1252. The translation determiner includes executable instructions adapted for determining a translation of a viewer, e.g. within a virtual and/or augmented reality environment. A translation determiner according to the present embodiment has been previously described herein.

The present embodiment is not particularly limited with regard to the source of the translation determiner and/or executable instructions thereof. Typically, though not necessarily, the translation determiner might be instantiated onto the processor 1252 from a data store such as a hard drive, solid state drive, etc., or from a communications link such as wife, a wired connection, etc. However, these are examples only, and other arrangements may be equally suitable. (These comments likewise apply to similar steps in FIGS. 12 and 13 herein, in that the present embodiment is not particularly limited with regard to sources for information associated therewith.)

Continuing in FIG. 12, a rotation determiner is instantiated on the processor 1254. The rotation determiner includes executable instructions adapted for determining a rotation of a viewer, e.g. within a virtual and/or augmented reality environment. A rotation determiner according to the present embodiment has been previously described herein.

A world space controller is instantiated on the processor 1258. The world space controller includes executable instructions adapted for determining a translation of the viewer with respect to world space that substantially corresponds with the translation of the viewer, and for determining a rotation of the viewer with respect to world space that substantially corresponds with the rotation of the viewer. A world space controller according to the present embodiment has been previously described herein.

A sphere space controller is instantiated on the processor 1260. The sphere space controller includes executable instructions adapted for determining a translation of the viewer with respect to sphere space that substantially corresponds with the translation of the viewer, and for determining a substantially zero rotation of the viewer with respect to sphere space. A sphere space controller according to the present embodiment has been previously described herein.

A display space controller is instantiated on the processor 1262. The display space controller includes executable instructions adapted for determining a substantially zero translation of the viewer with respect to display space regardless of the translation of the viewer, and for determining a substantially zero rotation of the viewer with respect to display space. A display space controller according to the present embodiment has been previously described herein.

Although FIG. 12 shows the method therein as being complete following step 1262, it is emphasized that the method in FIG. 12 is an example only. Other steps, other functions, etc. may be incorporated into the method, and/or other methods may be executed in combination with the method according to the present embodiment. For example, for at least some embodiments other executable instructions and/or data may be instantiated onto the processor, whether related to the method steps described herein or otherwise.

Figure 13:
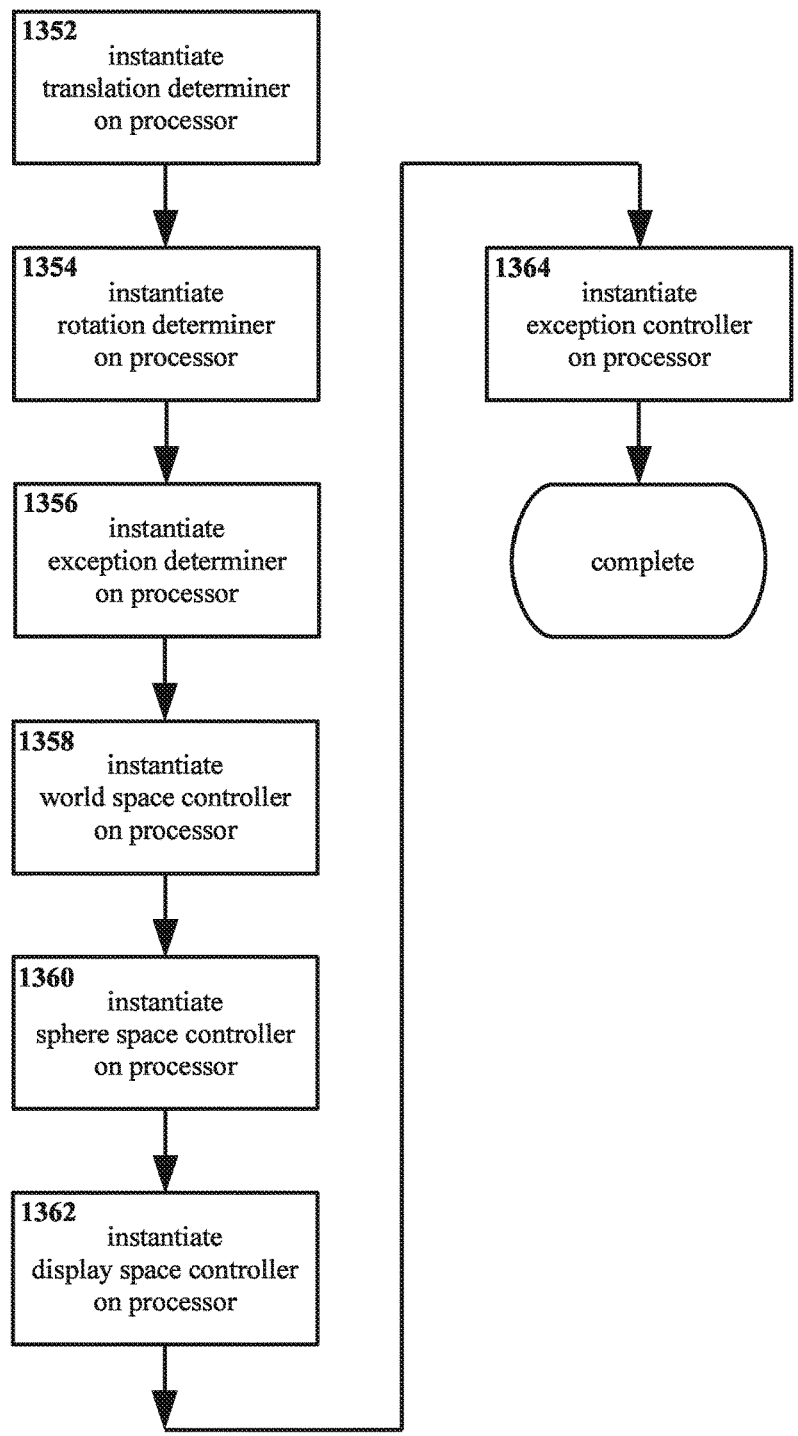
FIG. 13 shows another embodiment of a method for establishing an interface according to the present embodiment, enabling exceptions to default interaction behavior.

Referring now to FIG. 13, therein is shown a method for enabling a capability to manage interaction with a three dimensional interface in accordance with the present embodiment, further enabling exceptions to default behaviors as described elsewhere herein.

In the example method of FIG. 13, a translation determiner is instantiated on a processor 1352. A rotation determiner also is instantiated on the processor 1354.

Moving on in FIG. 13, an exception determiner is instantiated on the processor 1356. The exception determiner includes executable instructions adapted for determining the presence of an exception stimulus. An exception determiner according to the present embodiment has been previously described herein.

A world space controller is instantiated on the processor 1358. A sphere space controller also is instantiated on the processor 1360. A display space controller further is instantiated on the processor 1362.

Continuing in FIG. 13, an exception controller is instantiated on the processor 1364. The exception controller includes executable instructions adapted for determining an exception response as applied to world space, sphere space, display space, etc. An exception controller according to the present embodiment has been previously described herein.

Although FIG. 13 shows the method therein as being complete following step 1364, it is emphasized that the method in FIG. 13 is an example only. Other steps, other functions, etc. may be incorporated into the method, and/or other methods may be executed in combination with the method according to the present embodiment. For example, for at least some embodiments other executable instructions and/or data may be instantiated onto the processor, whether related to the method steps described herein or otherwise.

The present embodiment may be utilized with and/or incorporated into many forms, including but not limited to processors, devices and systems having processors therein, and devices and systems controlled in whole or in part by processors. Now with reference to FIG. 14, therein is shown an example of a use-case utilizing an embodiment of the present embodiment. The example of FIG. 14 considers an arrangement with respect to a hardware device such as the head-mounted display illustrated in FIG. 11. As shown and described with regard to FIG. 14, such hardware might for example be controlled with manipulation of an interface in one of or distributed through two or more of world space, sphere space, and display space according to the present embodiment. More concretely, virtual or augmented reality icons, controls, etc. may be disposed within world space, sphere space, and/or display space, and manipulated by the gestures of the person wearing the head-mounted display. Those gestures may be detected with camera (such as shown on the head-mounted display in FIG. 11), and interpreted using a processor (such as shown on the head-mounted display in FIG. 11), typically though not necessarily with executable instructions instantiated thereon. Commands then may be executed in response to the postures/gestures, at least certain such commands producing or altering visual output delivered to display screens (again such as those shown on the head-mounted display in FIG. 11), e.g. changes to a virtual reality and/or augmented reality interface, environment, etc. (including but not limited to world space, sphere space, and/or display space themselves).

Figure 14:
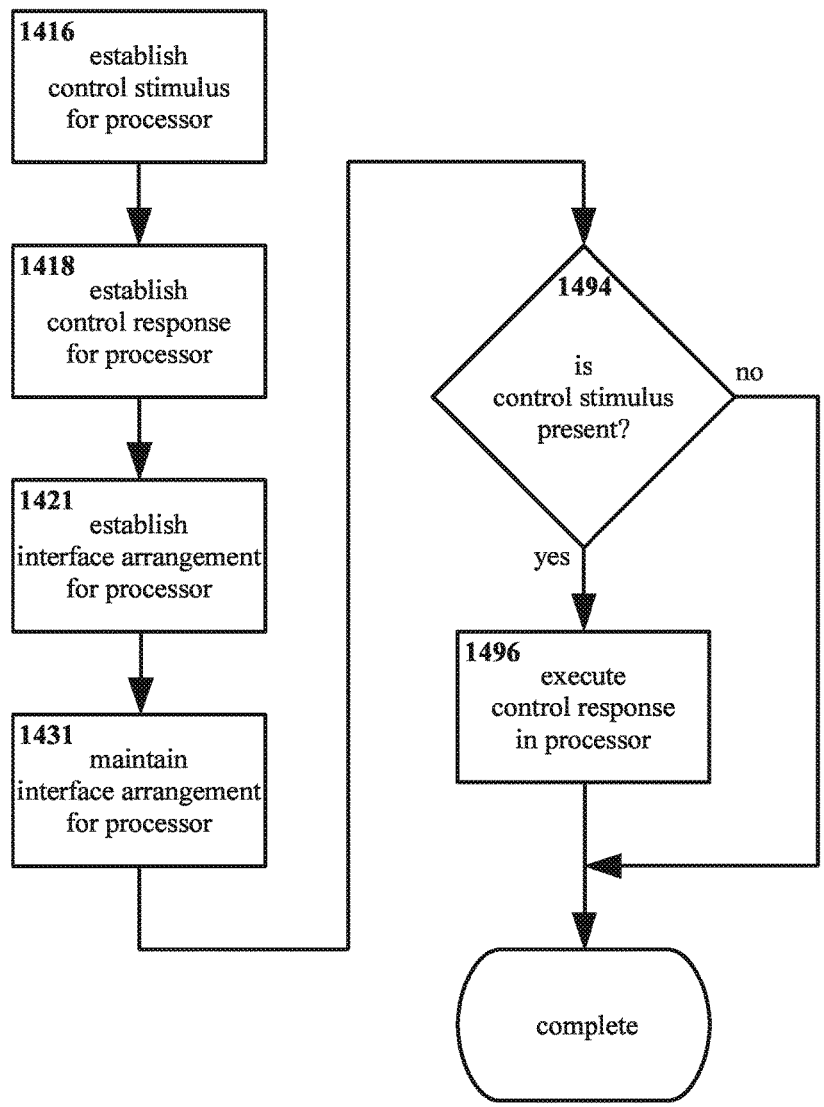
FIG. 14 shows an example embodiment of a method for controlling a processor by interacting with an interface using world space, sphere space, and display space according to the present embodiment.
Figure 15A:
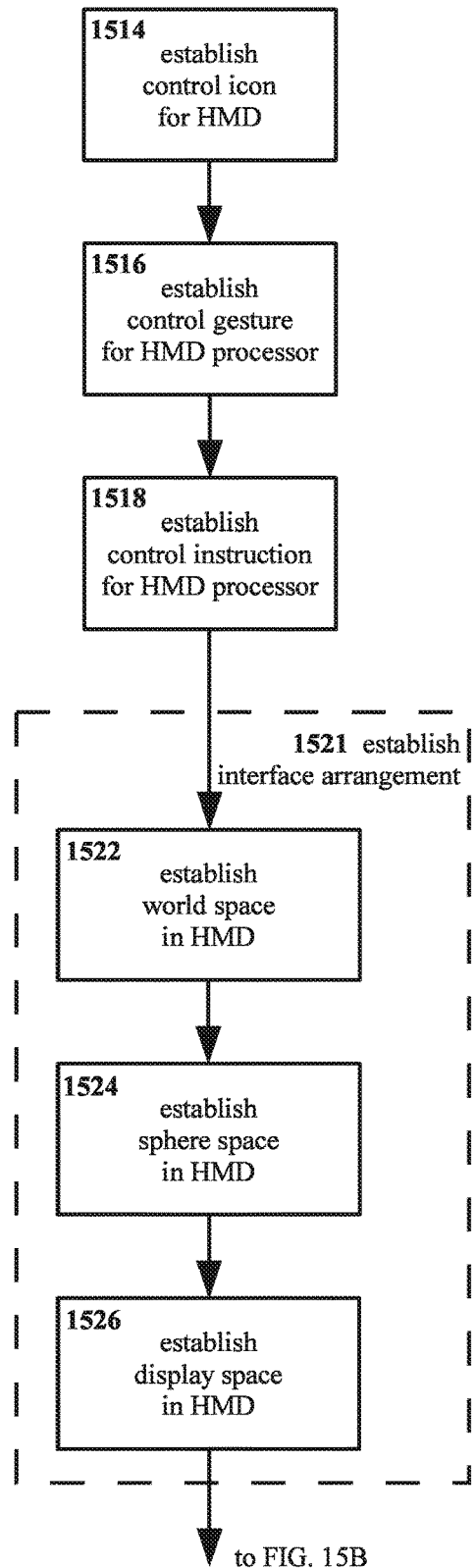
FIG. 15A through FIG. 15C shows another example embodiment of a method for controlling a processor by interacting with an interface using world space, sphere space, and display space according to the present embodiment.
Figure 15B:
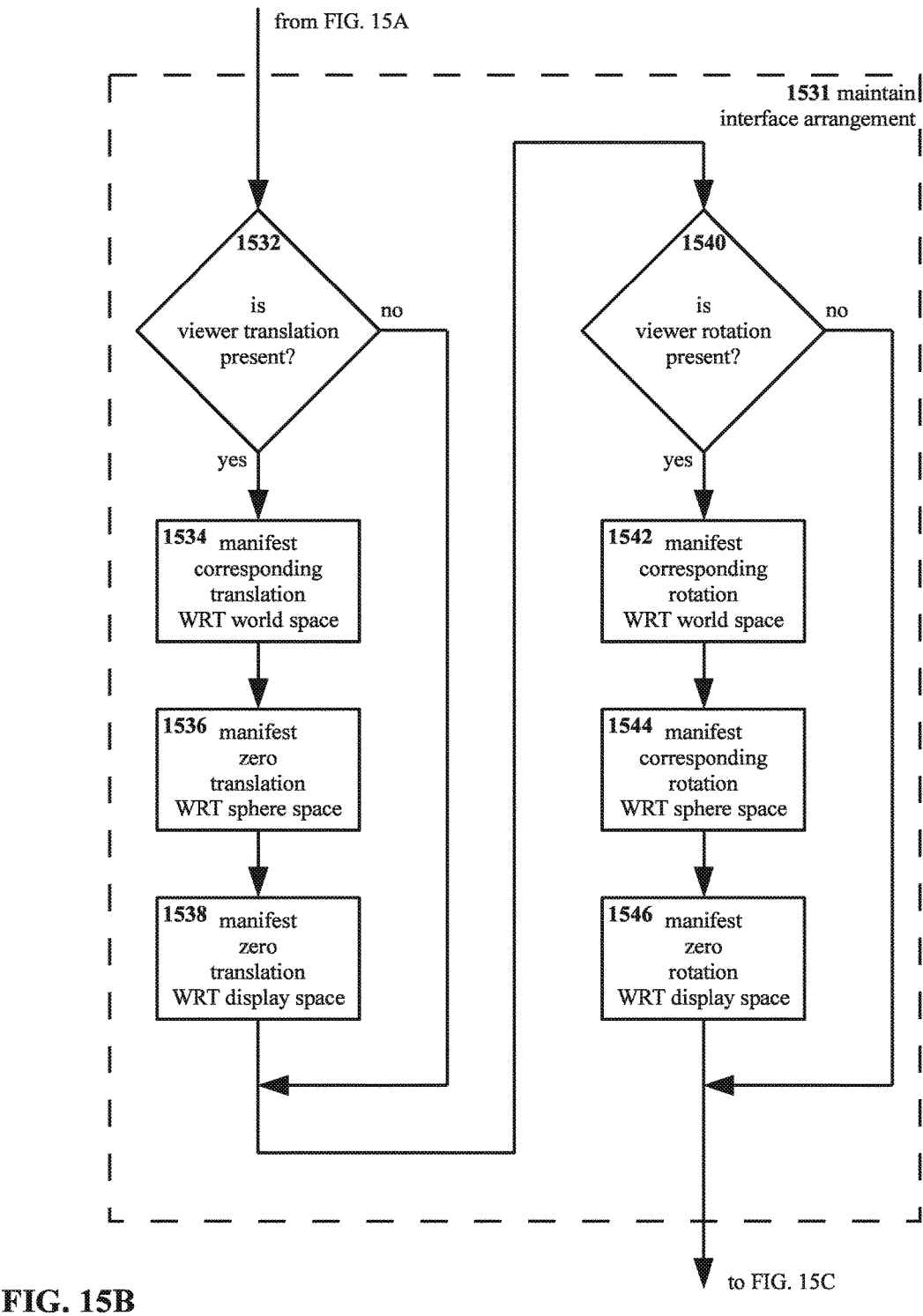
Figure 15C:
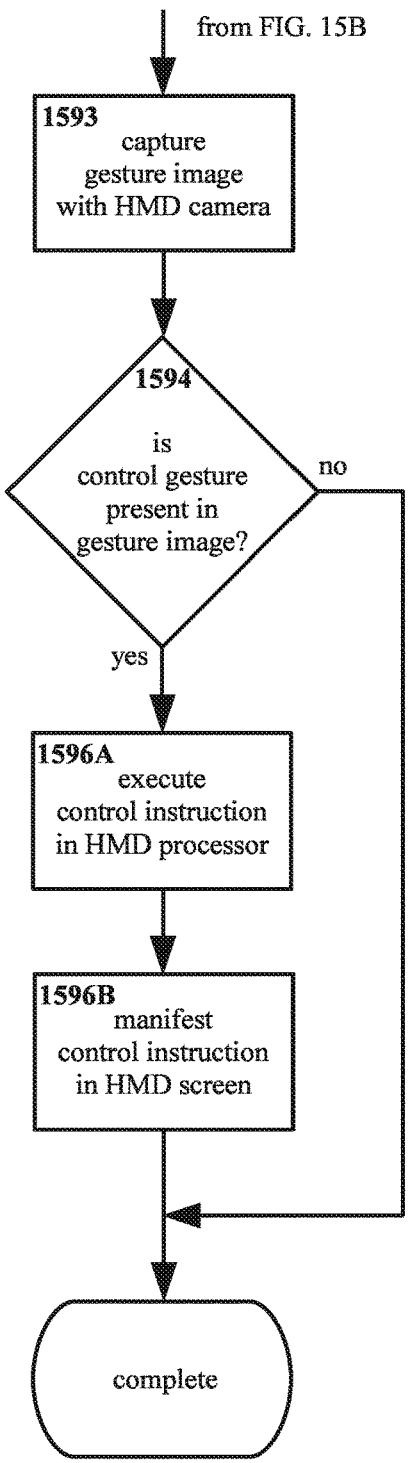

It is noted that a similar but more detailed example to that in FIG. 14 is presented in FIG. 15A, FIG. 15B, and FIG. 15C. Where FIG. 14 shows an overview of a larger method that may incorporate an embodiment of the present embodiment, FIG. 15A through FIG. 15C illustrate more specifically how individual steps in an example method according to the present embodiment (similar to that already shown and described with regard to FIG. 6) may be understood to serve within a practical implementation such as a head-mounted display. It is emphasized however that the present embodiment is not limited only to head-mounted displays, nor to the specific example methods shown in FIG. 14 and/or in FIG. 15A through FIG. 15C.

In FIG. 14, a control stimulus is established 1416 for a processor. A control stimulus is some form of action, manipulation, input, etc. that may serve to invoke some function within the processor or some system controlled by or otherwise in communication with a processor. For example, a control stimulus might be a specific hand gesture to be performed in free space, manipulation of a virtual icon or other entity in some specified fashion, etc. Typically, though not necessarily, a control stimulus may be established through instantiating executable instructions on the processor in question, for example as part of an operating system, an application, a gesture library, etc. These are examples only, and other arrangements may be equally suitable.

A control response is established 1418 for a processor. A control response is a processor function, operation in some system controlled or otherwise in communication with the processor, etc., to be carried out in response to a control stimulus (the associated control stimulus having been established in step 1416). Typically though not necessarily, a control response may be established through instantiating executable instructions on the processor in question, for example as part of an operating system, an application, a gesture library, etc. These are examples only, and other arrangements may be equally suitable.

Moving on in FIG. 14, an interface arrangement is established 1421 for the processor. The interface arrangement may include, but is not limited to, an arrangement of world space, sphere space, and display space according to the present embodiment.

In more colloquial terms with regard to steps 1416, 1418, and 1421 in FIG. 14, and particularly with regard to an example of a head-mounted display worn by a viewer (though the present embodiment is not limited only thereto), establishing 1416 the control stimulus may be considered as setting "what the viewer does" in terms of input, establishing 1418 the control response may be considered as setting "what the system does in response" to the viewer's input, and establishing the interface arrangement 1421 may be considered as providing an arrangement wherein the viewer may deliver such input, and/or experience such response. However this is an example only, and should not be understood as limiting the present embodiment only to such arrangements.

Continuing in FIG. 14, the interface arrangement is maintained 1431. That is, in the event of some change to conditions, the interface (established in step 1421) may respond in some fashion without necessarily being made irrelevant, being deactivated, etc. Typically though not necessarily, the interface may update in some fashion so as to retain usefulness for accepting additional control stimuli from the viewer, and/or for accommodating additional control responses resulting from the control stimuli. For the purposes of the example in FIG. 14, an interface arrangement having a world space, sphere space, and display space may respond to translation and/or rotation as previously described herein with regard to the world space, sphere space, and display space. As a more concrete example, when a viewer translates and/or rotates, their relationship with world space, sphere space, and/or display space may be updated (e.g. as described previously herein with regard to world space, sphere space, and display space). Note that maintaining the interface arrangement does not imply that the interface arrangement is or should be static, only that changes are accommodated. To continue the example above, translating might move a viewer away a control icon in world space, but world space (and possibly sphere space and/or display space) will update to accommodate the translation.

Still with reference to FIG. 14, a determination is made 1494 as to whether the control stimulus is present. If the determination is positive—if the control stimulus (e.g. gesture, etc.) is present—then the method proceeds to step 1496. If the determination is negative—if the control stimulus is not present—then the method skips step 1496.

If the determination in step 1494 is positive, the control response is executed 1496. That is, whatever processor function, operation, etc. as established in step 1418 is carried out by and/or within the processor. This may result, for example considering a head-mounted display, in a change in content as displayed to the viewer (new content added, existing content modified or removed, etc.), a change in the behavior of the interface thereof (e.g. changes to the parameters by which world space, sphere space, and/or display space operate), activation or deactivation of some component of the head-mounted display, communication with some external system, activation of, deactivation of, and/or input to an operating system, application, etc., and so forth. Other arrangements also may be equally suitable.

Although FIG. 14 shows the method therein as being complete following step 1594, it is emphasized that the method in FIG. 14 is an example only. Other steps, other functions, etc. may be incorporated into the method, and/or other methods may be executed in combination with the method according to the present embodiment.

Turning now to FIG. 15A through FIG. 15C, therein another example is illustrated showing more specifically how individual steps in an example method according to the present embodiment (similar to that already shown and described with regard to FIG. 6) may be understood to serve within a practical implementation such as a head-mounted display (similar to that already shown and described with regard to FIG. 11). Again, it is emphasized that this is an example only, and the present embodiment is not limited only thereto.

In FIG. 15A, a control icon is established 1514 for a head-mounted display (abbreviated "HMD" in FIG. 15A through FIG. 15C). For the example arrangement of FIG. 15A, the control icon may be considered to represent a virtual entity marking a position at which a viewer using a head-mounted display may execute a control gesture as input for controlling the HMD, programs running thereon, systems in communication therewith, etc. For example, the control icon might be a visible virtual switch, as might suggest to a viewer thereof changing the switch position with a suitable hand motion. However this is an example only. The control icon also may be a bounding box (visible or invisible) indicating a position, may be a virtual representation of a physical control such as a keyboard or dial, or may take some other form. Other arrangements also may be equally suitable.

A control gesture is established 1516 for the processor of the head-mounted display. The control gesture (at least somewhat similar to a control stimulus as described with regard to step 1416 of FIG. 14) is a hand gesture to be carried out by a viewer using the head-mounted display, so as to invoke some function within the processor in the head-mounted display, or some system controlled by or otherwise communication therewith. To continue the example in step 1514, the control gesture may be a hand motion corresponding with flipping a switch, made proximate the control icon established in step 1514. However, other arrangements may be equally suitable.

A control instruction is established 1518 for the head-mounted display processor. The control instruction is a processor instruction to be executed by the processor (at least somewhat similar to the control response described with regard to step 1418 in FIG. 14). Again to continue the example for steps 1514 and 1516, the control instruction may be to apply augmented reality information associated with the physical environment as viewed by the wearer of the head-mounted display (for example given a head-mounted display that is optically transparent so as to facilitate such). As more concrete examples, a passing bus might be assigned a tag identifying number and/or route, a driving path might be marked along the roadway, a nearby restaurant might exhibit a "star" rating based on reviews or menu highlights, etc. Other arrangements may be equally suitable.

Moving on in FIG. 15A, an interface arrangement is established 1521 (at least somewhat similar to what is described above with regard to step 1421 in FIG. 14). For purposes of the example in FIG. 15A, establishing 1521 the interface arrangement may be considered to include certain sub-steps, at least somewhat similar to steps already described herein (for example with regard to FIG. 6).

Namely, a world space is established 1522. A sphere space is established 1524. A display space is established 1526. A world space, sphere space, and display space according to the present embodiment and the establishment thereof are previously described herein.

It is noted that the control icon established in step 1514 may be affixed to, disposed within, and/or otherwise associated with any of world space, sphere space, and display space, and/or with some other space or no space (e.g. being a fully independent entity with unique behaviors). As such, the control icon may move (and/or depending on conditions not move) with world space, sphere space, and/or display space, depending on the association of the control icon.

Now with reference to FIG. 15B, the interface arrangement is maintained 1531 (at least somewhat similar to what is described above with regard to step 1431 in FIG. 14). Again for purposes of the example in FIG. 15B, maintaining 1531 the interface arrangement may be considered to include certain sub-steps, at least somewhat similar to steps already described herein (for example with regard to FIG. 6).

Namely, a determination is made 1532 as to whether a viewer translation is present. If the determination is negative—if a viewer translation is not found to be present—the method continues with step 1540. If the determination is positive—if a viewer translation is found to be present—the method continues with step 1534.

For purposes of the example in FIG. 15A through FIG. 15C, the determination 1532 of translation may be made for example through acquiring data from one or more sensors on the head-mounted display. For example, changes in the field of view a camera on the head-mounted display may be evaluated (e.g. using executable instructions disposed on the processor) to determine direction and/or magnitude of translation, etc. Alternately, accelerometers or other motion sensors disposed on the head-mounted display (not shown in the example head-mounted display of FIG. 11) might generate information regarding direction and/or magnitude of translation, etc. These are examples only and other arrangements may be equally suitable. The present embodiment is not limited with regard to how a determination of translation is made.

If the determination 1532 is positive, a translation is manifested 1534 with respect to world space, the translation at least substantially corresponding with the viewer translation. Substantially zero translation is manifested 1536 with respect to sphere space, and substantially zero translation is manifested 1538 with respect to display space.

Moving on in FIG. 15B, a determination is made as to whether a viewer rotation is present. If the determination is negative—if a viewer rotation is not found to be present— the method continues with step 1593. If the determination is positive—if a viewer rotation is found to be present—the method continues with step 1542.

For purposes of the example in FIG. 15A through FIG. 15C, the determination 1540 of rotation may be made for example through acquiring data from one or more sensors on the head-mounted display. For example, changes in the field of view a camera on the head-mounted display may be evaluated (e.g. using executable instructions disposed on the processor) to determine direction and/or magnitude of translation, etc. Alternately, gyroscopes or other motion sensors disposed on the head-mounted display (not shown in the example head-mounted display of FIG. 11) might generate information regarding direction and/or magnitude of rotation, etc. These are examples only and other arrangements may be equally suitable. The present embodiment is not limited with regard to how a determination of rotation is made.

If the determination 1540 is positive, a rotation is manifested 1542 with respect to world space, the rotation at least substantially corresponding with the viewer rotation. A rotation is also manifested 1544 with respect to sphere space, the rotation at least substantially corresponding with the viewer rotation. Substantially zero rotation is manifested 1546 with respect to display space.

Now with reference to FIG. 15C, a gesture image is captured 1593 with a camera disposed on the head-mounted display, the gesture image being an image that may (but also may not) include evidence of the control gesture (established in step 1516 being executed) in association with the control icon (established in step 1514).

A determination is made 1594 as to whether the control gesture is present in the gesture image. If the determination is positive—if the control gesture is found to be present— then the method continues in step 1596. If the determination is negative—if the control gesture is not found to be present—then the method skips steps 1596 and 1598.

For purposes of the example in FIG. 15A through FIG. 15C, the determination 1594 of the presence of the control gesture may be made for example through image evaluation the gesture image (or a series of such images over time, etc.). For example, the image(s) may be searched for a hand, that hand segmented from the background of the image, the configuration and/or changes in configuration over time for that hand compared to a standard for the control gesture (such standard for example possibly having been provided as part of establishing the control gesture 1516), etc. However, this is an example only, and other arrangements may be equally suitable. The present embodiment is not limited with regard to how a determination of the presence of the control gesture is made.

Moving on in FIG. 15C, the control instruction is executed 1596A in the head-mounted display processor (that control instruction having been established in step 1518). To continue the particular example previously presented with respect to steps 1514, 1516, 1518, etc., the processor may read, calculate, or otherwise make available augmented reality information associated with the physical environment surrounding the head-mounted display (and thus typically also surrounding the person wearing the head-mounted display).

In the embodiment shown in FIG. 15C, the execution of the control instruction is shown as two distinct sub-steps, 1596A and 1596B. This is an example only, to illustrate that steps may be split; likewise steps may be combined. For the particular example of FIG. 15C, in step 1596A a control instruction is executed within a processor, and (as described immediately hereafter) in step 1596B a visible change is outputted to a viewer as part of that execution. However, such an arrangement is an example only, and other arrangements may be equally suitable.

Moving on in FIG. 15C, as noted execution of the control instruction may be carried out by the processor, but may not necessarily be limited only to processor actions. In the example of FIG. 15C, the effects of the control instruction are manifested 1596B by the screen(s) of the head-mounted display. To continue the particular example above, the augmented reality information may be outputted in visible form so as to be overlaid on or otherwise associated with the physical environment surrounding the head-mounted display. Thus, following the example presented with respect to step 1518 the tags for the bus might be visibly displayed hovering over the bus, the driving path might be visibly displayed overlaid on the roadway, the star ratings or menu highlights might be displayed in free space near the door to the restaurant, etc.

However, as noted previously with regard to outputting and appearance of world space, sphere space, and display space with regard to FIG. 6, the present embodiment does not require that all embodiments, or any particular control instruction in a given embodiment, necessarily produce visible changes. For at least certain embodiments non-visible changes may be suitable, such as changes to permissions, security, communication protocols, etc.

Although FIG. 15C shows the method therein as being complete following step 1594, it is emphasized that the method in FIG. 15A through FIG. 15C is an example only. Other steps, other functions, etc. may be incorporated into the method, and/or other methods may be executed in combination with the method according to the present embodiment.

The above specification, examples, and data provide a complete description of the manufacture and use of the composition of the embodiment. Since many embodiments of the embodiment can be made without departing from the spirit and scope of the embodiment, the embodiment resides in the claims hereinafter appended.

The invention claimed is:
1. A method, comprising:
receiving, from an input device, a first constructive movement input representative of a non-translational movement of a body of a user, wherein:

the body does not move from a first point in a physical world environment to a second point in the physical world environment; and the non-translational movement mimics a movement of the body translationally moving from the first point to the second point;

executing, by a processing device, a translational instruction associated with the first constructive movement input, wherein the translational instruction comprises moving the body in a world space of an augmented reality environment from the first point in space to the second point in space, wherein the world space is a portion of the physical world environment being substantially bound by a portion of a physical world environment relative to a head mounted display;

receiving, from the input device, a first resizing stimulus;

executing, by the processing device, a first resizing instruction to reduce a size of a portion of the world space as displayed by a head-mounted display by a first amount indicated by the first resizing stimulus;

receiving, from the input device, a second constructive movement input; and executing, by the processing device, a second translational instruction associated with the second constructive movement input, wherein the second translational instruction comprises moving the body a second distance that corresponds with a first actual movement of the body in the reduced-size world space.

2. The method of claim 1, wherein the augmented reality environment comprises one or more objects overlaid onto the physical world environment.

3. The method of claim 1, wherein the first resizing stimulus is a user input.

4. The method of claim 3, wherein the user input comprises at least one of a voice command, a hand posture, a hand gesture, a stylus posture, a stylus gesture, an eye gesture, or a brainwave modulation.

5. The method of claim 1, wherein the first constructive movement input includes constructive rotational movement that corresponds to rotational movement by the head-mounted display where the head-mounted display remains at the first point and rotates about an axis.

6. The method of claim 1, wherein the first resizing stimulus is indicative of the body interacting with an augmented reality object displayed in the physical world environment.

7. The method of claim 1, further comprising:

receiving, from the input device, a second resizing stimulus;

executing, by the processing device, a second resizing instruction to increase the size of the portion of the world space as displayed by the head-mounted display by a second amount indicated by the second resizing stimulus;

receiving, from the input device, a third constructive movement input; and executing, by the processing device, a third translational instruction associated with the third constructive movement input, wherein the third translational instruction comprises moving the body a third distance that corresponds with a second actual movement of the body in the increased-size world space.

8. The method of claim 1, further comprising adapting, by the processing device, the physical world environment to be displayed as a virtual reality environment.

9. The method of claim 8, wherein the portion of the world space that is resized is a portion of the physical world environment displayed as the virtual reality environment.

10. The method of claim 1, wherein the portion of the world space that is resized is a portion of the physical world environment within a viewing range of the user.

11. A device, comprising:

an input device configured to sense a first constructive movement input representative of a non-translational movement of a body of a user that does not move from a first point to a second point in a physical world environment, wherein the non-translational movement mimics a movement of the body translationally moving from the first point to the second point;

a processing device coupled to the input device, the processing device configured to:

execute a translational instruction associated with the first constructive movement input, wherein then translational instruction comprises moving the body in a world space of an augmented reality environment from the first point to the second point, wherein the world space is a portion of the physical world environment being substantially bound by a portion of a physical world environment relative to a head mounted display;

in response to receiving a first resizing stimulus, execute a first resizing instruction to reduce a size of a portion of the world space as displayed by a head-mounted display by an amount indicated by the first resizing stimulus;

receive, from the input device, a second constructive movement input; and execute a second translational instruction associated with the second constructive movement input, wherein the second translational instruction comprises moving the body a second distance that corresponds with a first actual movement of the body in the reduced-size world space.

12. The device of claim 11, wherein the processing device is further configured to:

receive, from the input device, a second resizing stimulus;

execute a second resizing instruction to increase a size of the portion of the world space as displayed by the head-mounted display by an amount indicated by the second resizing stimulus;

receive, from the input device, a third constructive movement input; and execute a third translational instruction associated with the third constructive movement input, wherein the third translational instruction comprises moving the body a third distance that corresponds with a second actual movement of the body in the increased-size world space.

13. The device of claim 11, wherein the processing device is further configured to receive an exception stimulus and execute an exception instruction associated with the exception stimulus.

14. The device of claim 13, wherein the exception instruction is an instruction to disregard a translational movement by the user in the world space.

15. The device of claim 13, wherein the exception stimulus is at least one of a gesture, a verbal command, or a signal or data from another device or input device.

16. The device of claim 13, wherein the exception stimulus is a motion data from an input device located in a vehicle indicating a movement of the vehicle.

17. A system, comprising:
a head-mounted display configured to display a physical world environment in an augmented reality environment, the physical world having a first size;
an input device configured to sense a constructive movement input representative of a non-translational movement of a body that does not move from a first point to a second point in the physical world environment, wherein the non-translational movement mimics a movement of the body translationally moving from the first point to the second point;
a processing device coupled to the input device and the head-mounted display, the processing device configured to:
 in response to receiving a first resizing stimulus, execute a first resizing instruction to reduce a size of a world space from the first size to a second size indicated by the first resizing stimulus, wherein the world space is a portion of the physical world environment being substantially bound by a portion of a physical world environment relative to a head mounted display;
 receive, from the input device, the constructive movement input; and
 execute a second translational instruction associated with the constructive translational movement input, wherein the translational instruction comprises moving the body a distance that corresponds with a first actual movement of the body in the reduced-size world space.

18. The system of claim 17, wherein the processing device is further configured to adapt the physical world environment to be displayed as a virtual reality environment, wherein the portion of the world space that is resized is a portion of the physical world environment display as the virtual reality environment.

19. The system of claim 17, wherein the processing device is further configured to:
 receive, from the input device, a second resizing stimulus;
 execute a second resizing instruction to increase a size of a portion of the world space as displayed by the head-mounted display by an amount indicated by the second resizing stimulus;
 receive, from the input device, a third constructive movement input; and
 execute a third translational instruction associated with the third constructive movement input, wherein the third translational instruction comprises moving the body a third distance that corresponds with a second actual movement of the body in the increased-size world space.

* * * * *